United States Patent
Sagasaki et al.

(10) Patent No.: US 7,155,303 B2
(45) Date of Patent: Dec. 26, 2006

(54) NUMERIC CONTROL METHOD AND NUMERIC CONTROL SYSTEM

(75) Inventors: Masakazu Sagasaki, Tokyo (JP); Toshio Harada, Tokyo (JP); Takashi Ito, Aichi (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 98 days.

(21) Appl. No.: 10/504,027

(22) PCT Filed: Feb. 7, 2002

(86) PCT No.: PCT/JP02/01035

§ 371 (c)(1),
(2), (4) Date: Jan. 27, 2005

(87) PCT Pub. No.: WO03/067345

PCT Pub. Date: Aug. 14, 2003

(65) Prior Publication Data
US 2005/0209712 A1 Sep. 22, 2005

(51) Int. Cl.
*G06F 19/00* (2006.01)
*G05B 13/02* (2006.01)
*G05B 19/42* (2006.01)

(52) U.S. Cl. .......................... 700/173; 700/28; 700/86

(58) Field of Classification Search ............... 700/173, 700/28, 159, 160, 171, 174, 175, 56, 86
See application file for complete search history.

(56) References Cited

U.S. PATENT DOCUMENTS 4,408,280 A * 10/1983 Bedini et al. ............... 700/173
6,502,007 B1 * 12/2002 Kanamoto et al. .......... 700/173
6,597,968 B1 * 7/2003 Matsumoto et al. ........ 700/170
2002/0091460 A1 * 7/2002 Allen ......................... 700/173

FOREIGN PATENT DOCUMENTS

| JP | 62-188645 A | 8/1987 |
| JP | 6-309025 A | 11/1994 |
| JP | 8-112737 A | 5/1996 |
| WO | WO00/12258 A1 | 3/2000 |

\* cited by examiner

*Primary Examiner*—Leo Picard
*Assistant Examiner*—Charles Kasenge
(74) *Attorney, Agent, or Firm*—Sughrue Mion, PLLC

(57) ABSTRACT

A numerical control system comprises a high speed operation buffer 27 for storing all the NC control data (interpolation movement amount or acceleration or deceleration data, etc.) occurring in time series by executing apart program, a time series data parallel display part 62 for reading and displaying the data in time series, an optimization processing part 61 for making the edit process such as recalculation process to deletion of Null data, etc. and temporally shift the group of specific data or change the pattern in the group of said data, and a second high speed operation buffer 60 for storing the processing result. The series of processes are performed by a personal computer (PC) 51 connected to an NC apparatus 1 to be able to exchange data. The data stored in the second high speed operation buffer 60 is transferred to the side of the NC apparatus 1, and read and executed, whereby the optimal processing with temporal editing is performed at high speed.

19 Claims, 17 Drawing Sheets

FIG. 4

| DT.NO. | SYSTEM 1 | | | | | | | SYSTEM 2 | | | | | | |
|---|---|---|---|---|---|---|---|---|---|---|---|---|---|---|
| | AXIS 1 | AXIS 2 | WAIT | M | S | T | SQ.NO. | AXIS 3 | AXIS 4 | WAIT | M | S | T | SQ.NO. |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |

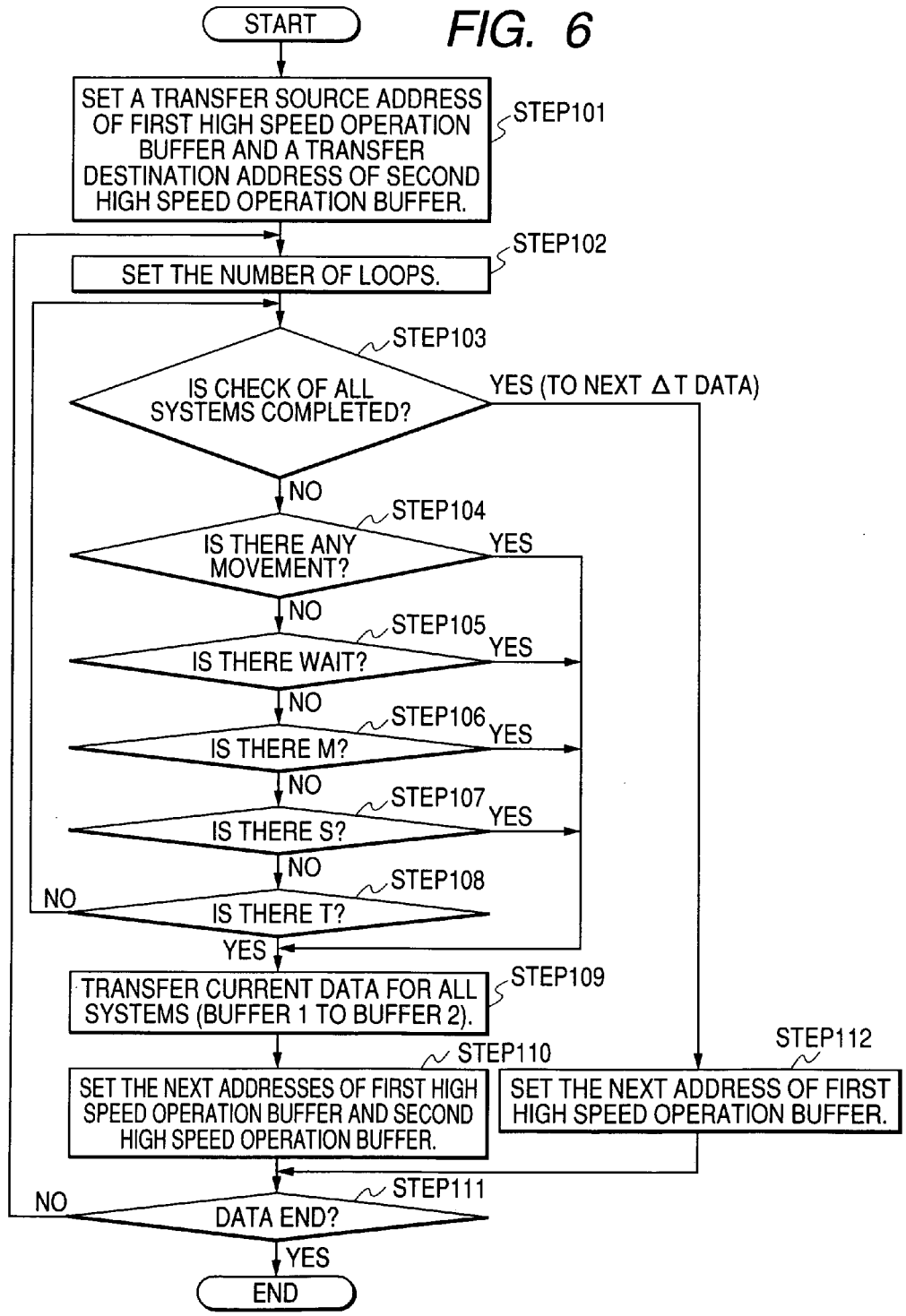

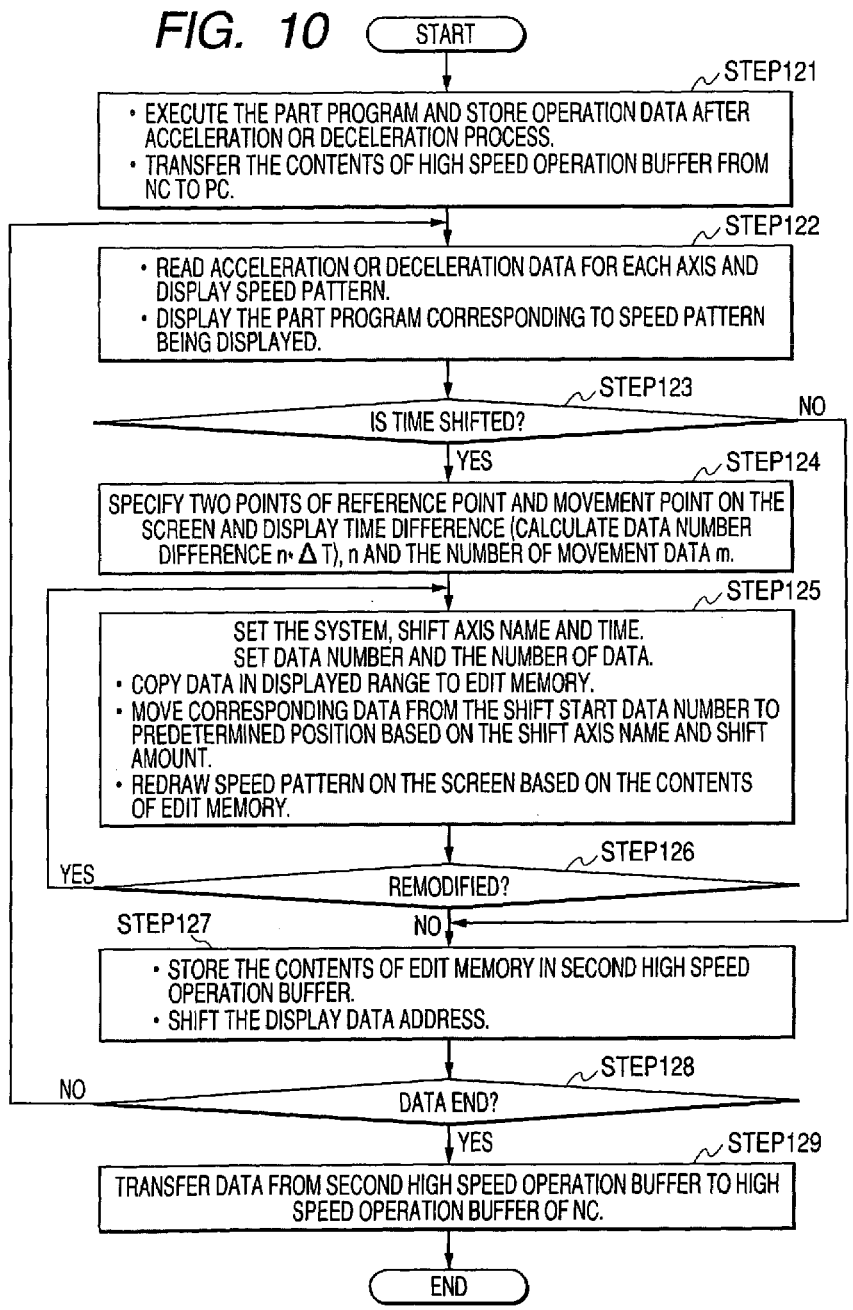

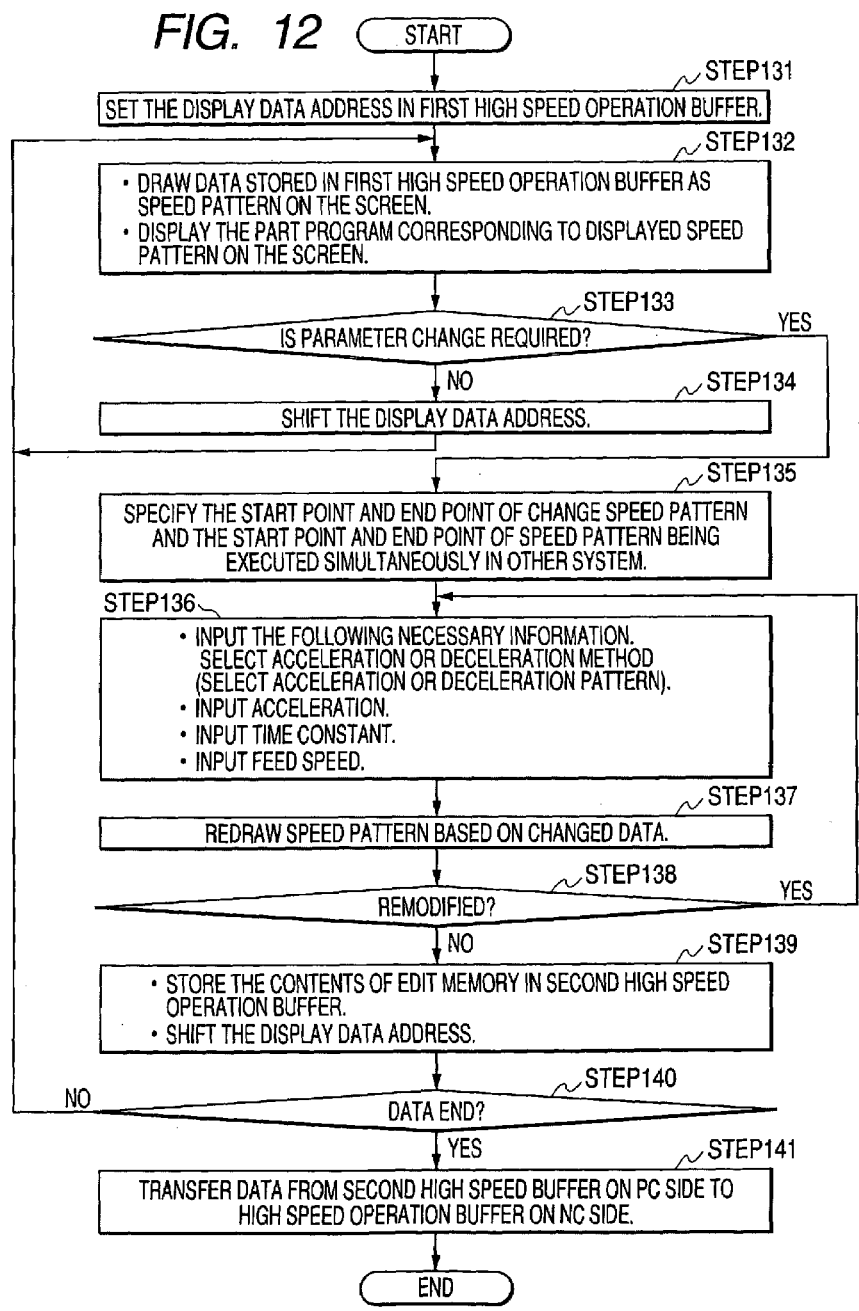

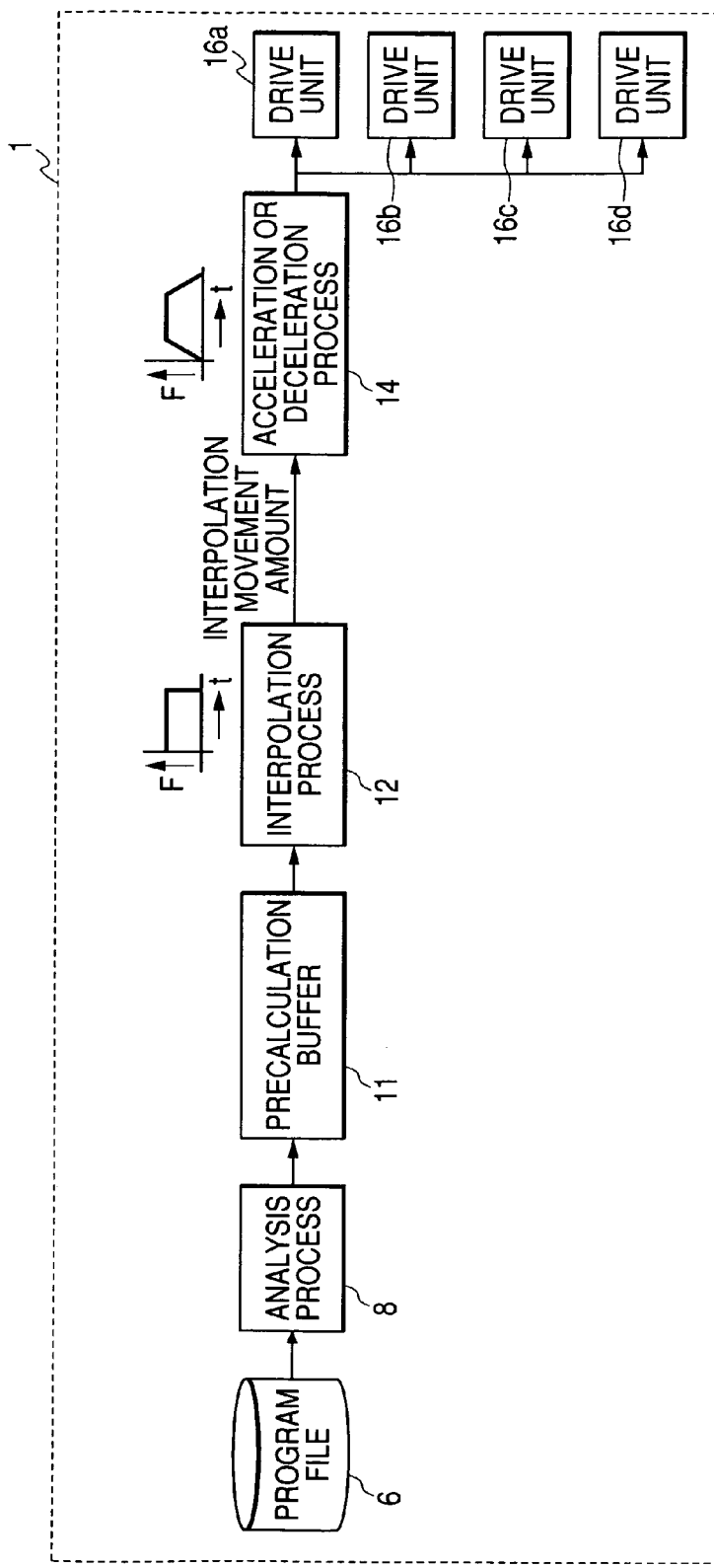

NUMERIC CONTROL METHOD AND NUMERIC CONTROL SYSTEM

TECHNICAL FIELD

The present invention relates to a numerical control (hereinafter referred to as an NC) method and an NC system, and more particularly to a numerical control method and an NC system in which an optimization process is performed by changing the control axis data in various ways after making an actual machine check for a part program, and the NC operation is performed based on the changed control data.

BACKGROUND ART

In the conventional NC apparatus, when a newly created part program is employed for processing the product, the machine is firstly not activated, but the syntax check for the program or the simulation of tool locus is made, and the machine is operated with no-load. Thereby, if there is no problem, the workpiece is mounted, processed as trial, and finally processed.

Referring to FIGS. 16 and 17, the conventional NC apparatus will be described below.

FIG. 16 is a block diagram of the conventional NC apparatus. In FIG. 16, reference numeral 1 denotes the NC apparatus, 2 denotes a CPU (Central Processing Unit), 3 denotes an input unit interface (hereinafter referred to as an I/F), 4 denotes apart program, and 5 denotes a data memory having a part program memory 6, a precalculation buffer 11, a parameter memory 9 and an axial data memory 10. Reference numeral 7 denotes a control program memory storing an analysis processing part 8, an interpolation processing part 12, a basic controlling part 26, an NC axis controlling part 13, a screen processing part 25, a PLC (Programmable Logic Controller) processing part 24, a spindle controlling part 19, and an acceleration or deceleration processing part 14, each of which is configured by a software program. Reference numeral 15 denotes a control axis I/F, 16 denotes a control axis drive unit, 17 denotes a control axis motor, 18 denotes a detector, 20 denotes a spindle I/F, 21 denotes a spindle drive unit, 22 denotes a spindle motor, and 23 denotes a detector.

The operation of the NC apparatus as shown in FIG. 16 will be described below.

The CPU 2 sequentially reads and executes a control program in accordance with a procedure programmed in computer language and implements the predetermined functions via a variety of IFs. The input unit I/F 3 is controlled by apart program reading program included in the basic controlling part 26, in which the part program 4 recorded in the recording medium is read, and stored as a part program file in the part program memory 6 within the data memory 5. The CPU 2 sequentially reads the part program from the part program memory 6 upon an automatic operation initiation command, whereby the analysis processing part 8 stored in the control program memory 7 analyzes the instructions described in the part program 4 and stores the analyzed data for each control element in the precalculation buffer 11.

The interpolation processing part 12 calculates the interpolation movement amount from each control axis data stored in the precalculation buffer 11 in accordance with various parameters stored in the parameter memory 9, using the axial data memory 10. The interpolation movement amount is input into the NC axis controlling part 13 to update the coordinate system or make the acceleration or deceleration control. This interpolation is intended to calculate the movement amount (micro line segment) for each axis per control unit time (hereinafter simply abbreviated as $\Delta T$) of the NC apparatus 1, when a specified circular arc is performed at a specified rate, for example. The specified circular arc is formed by linking the micro line segments. The movement amount for each axis calculated at this time is the theoretical value out of consideration for the machine response at commanded speed. To drive the actual machine, it is required to make the acceleration or deceleration process by gradually increasing the speed and gradually decreasing the speed to prevent occurrence of mechanical vibrations. The acceleration or deceleration processing part 14, which is included in the NC axis controlling part 13, converts the interpolation movement amount output as nearly fixed speed into the movement amount subjected to acceleration or deceleration in accordance with an acceleration or deceleration pattern such as a linear or exponential function form selected from the parameter memory 9 and the time constant, and outputs the converted movement amount to the control axis I/F 15.

The control axis I/F 15 outputs the interpolation movement amount subjected to acceleration or deceleration processing for the corresponding axis in a group of control axis drive devices 16 connected to it. The control axis drive device 16 converts the input interpolation movement amount into the drive power, which is applied to the control axis motor 17 to drive the control axis motor 17. The rotation amount (angle and/or speed) of the control axis motor 17 is detected by the detector 18 such as an encoder, and fed back as the positional information to the axial data memory 10 via the control axis drive device 16 and the control axis I/F 15. Thereby, each control axis is controlled so that the tool or workpiece is moved to the specified position in the specified locus or speed.

For the spindle (typically around which the tool is rotated in the milling system or the workpiece is rotated in the turning system), like the control axis, a spindle command (S command) specified in the part program is analyzed by the analysis processing part 8, and the rotation number is obtained by the spindle controlling part 19. From this result, a rotating speed command of the motor is produced and output via the CPU 2 to the spindle I/F 20, whereby the spindle control data is output to the spindle drive device 21. The spindle control data is converted into a drive power of the spindle motor 22 by the spindle drive device 21, the drive power being applied to the spindle motor 22 to drive the spindle motor 22. The rotation amount (angle and/or speed) of the spindle motor 22 is detected by the detector 23 such as an encoder, and fed back through a speed loop to the spindle drive device 21, and fed back as the rotating speed information via the spindle I/F 20 to the axial data memory 10. Thereby, the spindle is controlled to get to the specified rotating speed.

FIG. 17 shows a data flow from the part program to the control of the motor by excerpting the main components from FIG. 16. These components are designated by the same reference numerals as in FIG. 16. The drive device 16 is represented by four axis drive devices 16a to 16d.

For the part program stored in the program file (part program memory) 6, the contents of each command block in the part program are decrypted by the analysis processing part 8, the control data at each control address being stored in the precalculation buffer 11 after the necessary operations or processing. Using the movement amount of control axis and the feed speed data among the control data stored in the precalculation buffer 11, the movement amount per unit time, or the interpolation movement amount, is obtained in the interpolation processing part 12. The interpolation movement amount is produced as the nearly fixed value corresponding to the speed to come closer to the commanded speed during the execution.

If the interpolation movement amount is input in to the acceleration or deceleration processing part 14, it is converted in accordance with the preset acceleration or deceleration pattern and the time constant so that the movement speed of the tool or workpiece may draw a predetermined acceleration or deceleration pattern, and input into the group of drive devices 16a to 16d.

The operation of the machine with a predetermined number of axes is controlled based on the part program by driving the motor with the above data flow to perform the machine processing.

By the way, generally, the NC apparatus has basically the configuration of von Neumann type computer using a microprocessor, and the software for controlling this system employs a time division control method using a real time operating system. In this system, a sequential part program that is a task related with hierarchical structure is executed in time division in a predetermined order upon an interrupt signal (hereinafter referred to as IT) for control unit time $\Delta T$ (e.g., 10 ms). Therefore, if the program being executed is interrupted halfway, the operation result may be output in blank. In the case of the NC apparatus, this appears as a phenomenon that the machine (tool) position control information does not exist, or null data is output. Though the interrupt itself has almost no influence on the processed face, the cycle time may be longer if the short time is accumulated. The blank time arises when there is dead time on the system configuration, a program execution suspension due to IT or priority level, or response idle time for executing the auxiliary command.

The details thereof will be described below.

(1) Dead Time on the System Configuration

The distribution data is not momentarily produced by automatically initiating the machine. A lot of tasks of reading and analyzing the part program, and making predetermined operations are firstly performed to prepare the distribution data for activating the machine. Accordingly, the dead time is necessarily produced to one degree or another. Usually, the time from the start of cycle to the start of distribution is 3IT (=30 ms) on average. Also, when the sub-program is called and analyzed after initiation, 2IT (=20 ms) is further needed.

(2) Program Execution Suspension

Since the analysis processing time of a macro program is long, a program execution suspension occurs due to an interrupt of upper-level task. In the NC apparatus, the program is executed, within a processing period ($\Delta T$=10 ms), in the order of basic control (OS), NC axis control (acceleration or deceleration process), spindle control, pulse data conversion process, divided output process, interpolation process, PLC process, analysis process and screen process. When the time-consuming macro program is analyzed after the acceleration or deceleration or interpolation process having higher priority level, the program is suspended halfway if the processing is not ended within $\Delta T$, and when the order of program processing comes around in the next $\Delta T$, the program suspended at the previous time is continued. Accordingly, when it takes a long time to analyze the macro program, the idle time of $\Delta T*n$ (at least 2 cycles when interrupted) occurs, whereby the interpolation data for the next block may not be produced.

(3) Response Idle Time for Executing the Auxiliary Command

In the normal M command (auxiliary command) with external processing, when an M command completion signal is input from the external sequence, the already analyzed and prepared contents of the next buffer register are executed, and the analysis processing for the next program block is started. In the normal processing, since the M command completion signal is read by the NC that scans a completion signal set in the PLC, the time of 2 cycles (2$\Delta T$) at maximum is required for this response, which becomes the dead time.

Also, the typical part program is composed of a so-called one system command in a combination of three or two axes such as X axis, Y axis and Z axis for the milling system or X axis and Z axis for the turning system, for example. On the contrary, a lathe part program of dual system control in which two systems having a single axis or multiple axes are independently provided or cooperate to process one workpiece is composed of commands for two axes for each system or a total of four axes. In this multi-system program, because dual system operations cooperate or continue, the operation timing or control pattern of one system should be changed in accordance with the operation pattern of the other system, whereby the processing time is shortened, or the load of the machine is relieved with the processing time unchanged.

Though the dead time is only small, in the so-called program check, the tool locus may be checked, but the dead time presence check or the timing check between systems can not be made. Also, since the dead time is not resolved by the simple edit or programming method, those problems were left unsolved.

If the workpiece having a processing time of 30 seconds is processed in continuous operation of 24 hours (1440 minutes), 2880 products are manufactured. Assuming that the time required for processing one workpiece is small but the dead time is at least about 0.1 seconds (10$\Delta T$) per workpiece, more 10 products or less in a day, or more about 3500 products in a year are manufactured by removing the dead time.

DISCLOSURE OF THE INVENTION

This invention has been achieved to solve the above-mentioned problems, and it is an object of the invention to provide a numerical control method and a numerical control system in which a non-operation time necessarily occurring with an NC apparatus is eliminated.

Also, it is another object of the invention to provide a numerical control method and a numerical control system in which the machine controls efficiently.

Also, it is another object of the invention to provide a numerical control method and a numerical control system in which the machine life is lengthened.

In order to achieve the above object, this invention provides a numerical control method characterized by including a step of storing in a memory the control data of a control axis obtained by making an actual machine check for a part program of a numerical control machine tool, a step of performing a an optimization process of deleting a series of control data when the contents of all the control items at the same time are zero for the control data stored in the memory, and a step of executing the numerical control based on the optimized control data in the memory.

Also, this invention includes a step of storing in a memory the control data of a control axis generated at every control unit time in a numerical control apparatus, the control data being obtained as the output data by performing a part program for numerical control machine tool on an actual numerical control machine tool, a step of graphically displaying the control data stored in the memory as a speed pattern on a screen, and performing a predetermined optimization process for the control data upon a processing instruction issued based on the display contents, a step of storing the optimized control data in the memory, and a step of executing the numerical control based on the optimized control data in the memory.

Also, in this invention, when the control data stored in the memory is displayed on the screen, the control data is displayed in parallel for each control axis.

Also, in this invention, the optimization process includes moving the storage position of the relevant control data so that the movement end time of any control axis may be coincident with the movement end time of a specified control axis.

Also, in this invention, the optimization process includes performing inputs for making the movement end time of a predetermined control axis coincident with the movement end time of another control axis by indicating a predetermined location of the displayed speed pattern on the screen, using a pointing device, and moving the storage position of the control data at the predetermined control axis, based on the inputs so that the movement end time of the predetermined control axis may be coincident with the movement end time of another control axis.

Also, in this invention, the optimization process includes performing an instruction for finishing the positioning of a predetermined control axis within a period of movement time of another control axis by indicating a predetermined location of the displayed speed pattern on the screen, using a pointing device, and changing the contents of the control data at the predetermined control axis, based on the instruction, so that the positioning of the predetermined control axis may be finished within the period of movement time of another control axis.

Also, this invention provides a numerical control system comprising a memory for storing the control data of a control axis obtained by making an actual machine check for a part program of a numerical control machine tool, an optimization processing part for performing an optimization process of deleting a series of control data when the contents of all the control items at the same time are zero for the control data stored in the memory, a memory for storing the control data optimized by the optimization processing part, and a numerical controlling part for executing the numerical control based on the optimized control data in the memory.

Also, this invention comprises a memory for storing the control data of a control axis generated at every control unit time in a numerical control apparatus, the control data being obtained as the output data by performing a part program for numerical control machine tool on an actual numerical control machine tool, a display processing part for graphically displaying the control data stored in the memory as a speed pattern on a screen, an optimization processing part for performing a predetermined optimization process for the control data upon a processing instruction issued based on the display contents displayed on the display processing part, a memory for storing the optimized control data by the optimization processing part, and a numerical control part for executing the numerical control based on the optimized control data in the memory.

Also, in this invention, the display processing part displays the control data in parallel for each control axis when the control data stored in the memory is displayed on the screen.

Also, in this invention, the optimization processing part moves the storage position of the relevant control data among the control data of each control axis stored in the memory, so that the movement end time of any control axis may be coincident with the movement end time of a specified control axis.

Also, in this invention, the optimization processing part performs inputs for making the movement end time of a predetermined control axis coincident with the movement end time of another control axis, by indicating a predetermined location of the displayed speed pattern on the screen, using a pointing device, and moves the storage position of the control data at the predetermined control axis, based on the inputs so that the movement end time of the predetermined control axis may be coincident with the movement end time of another control axis.

Also, in this invention, the optimization processing part performs an instruction for finishing the positioning of a predetermined control axis within a period of movement time of another control axis by indicating a predetermined location of the displayed speed pattern on the screen, using a pointing device, and changing the contents of the control data at the predetermined control axis, based on the instruction, so that the positioning of the predetermined control axis may be finished within the period of movement time of another control axis.

BRIEF DESCRIPTION OF THE DRAWINGS

FIG. 4 is a table showing one configuration example of stored information in the numerical control system according to the embodiments 1 to 3 of the invention.

FIG. 6 is a flowchart of a common no-operation time deletion automatic edit in the numerical control system according to the embodiment 1 of the invention.

FIG. 10 is a flowchart with time shift edit of non-interpolation axis data in a numerical control system according to the embodiment 2 of the invention.

FIG. 12 is a flowchart with non-interpolation axis parameter change in the numerical control system according to the embodiment 3 of the invention.

FIG. 17 is a data flowchart of the conventional numerical control system.

BEST MODE FOR CARRYING OUT THE INVENTION

Embodiment 1 (Description for Overall Configuration and Automatic Deletion of Dead Time)

Referring to FIGS. 1 to 7, an embodiment 1 of the present invention that is applied to a dual system lathe will be described below.

Figure 1:
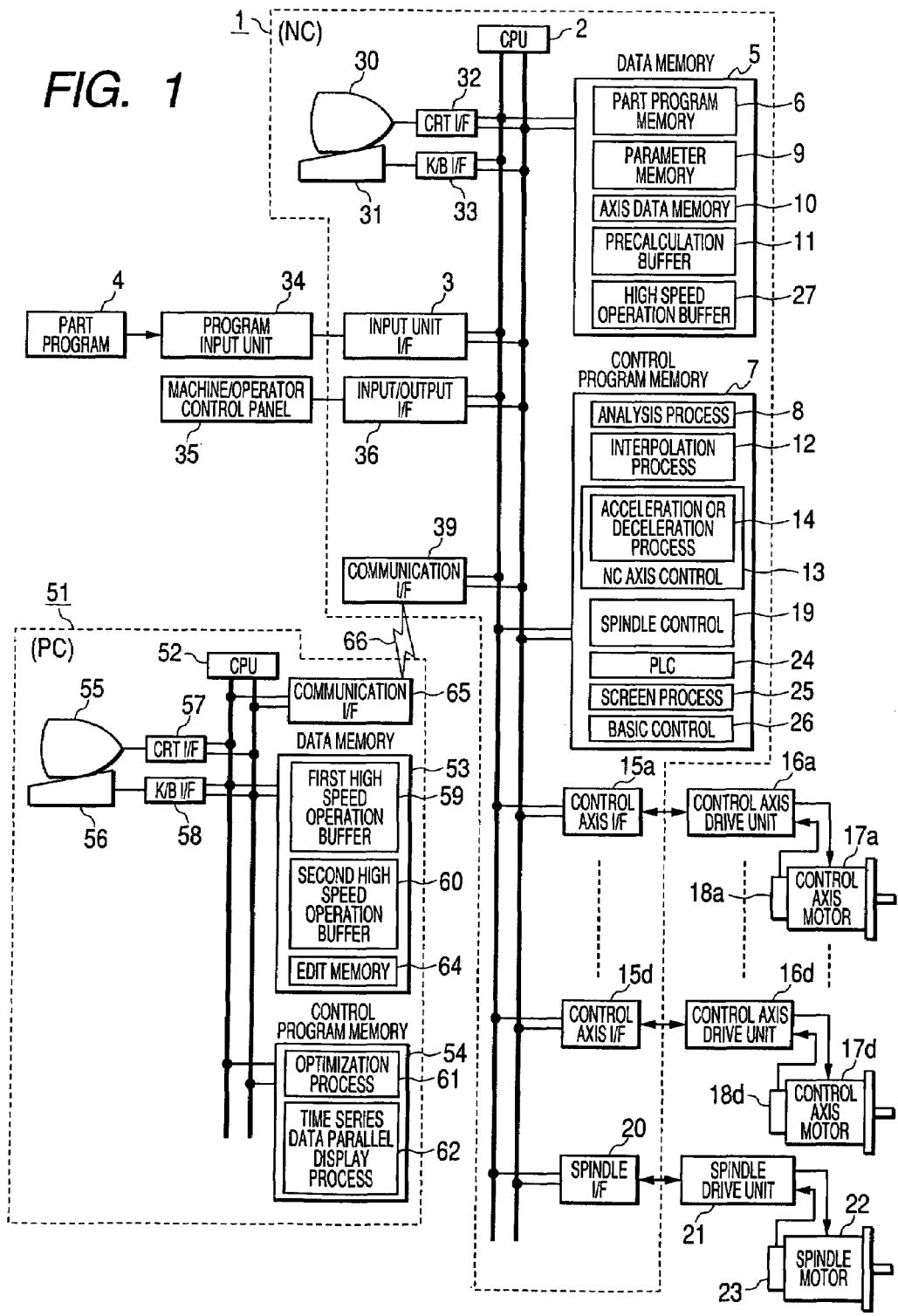
FIG. 1 is a block diagram showing a configuration of a numerical control system according to the embodiments 1 to 3 of the present invention.
Figure 2:
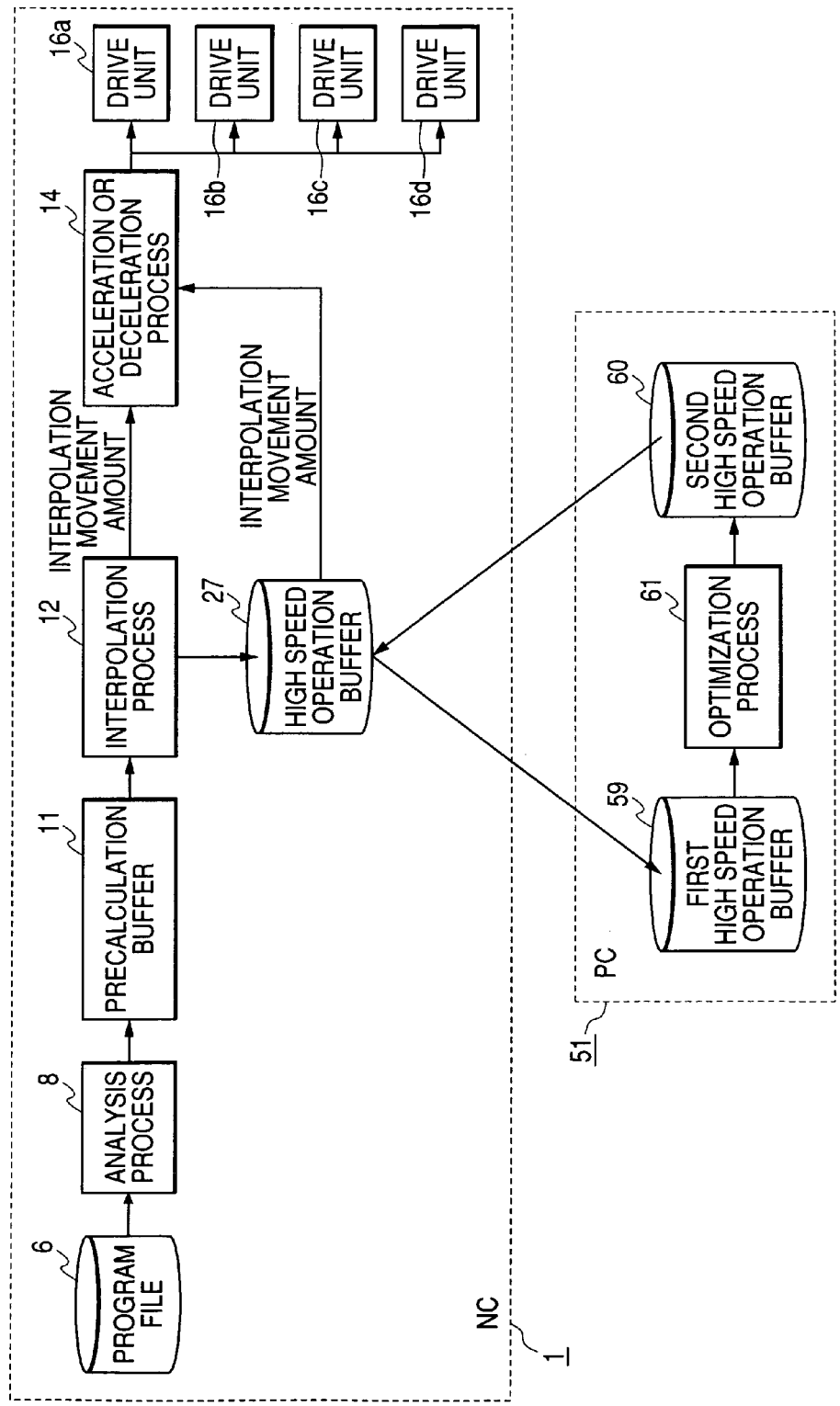
FIG. 2 is a data flowchart in which an interpolation movement amount is stored in a high speed operation buffer before an acceleration or deceleration process in the numerical control system according to an embodiment 1 of the invention.
Figure 3:
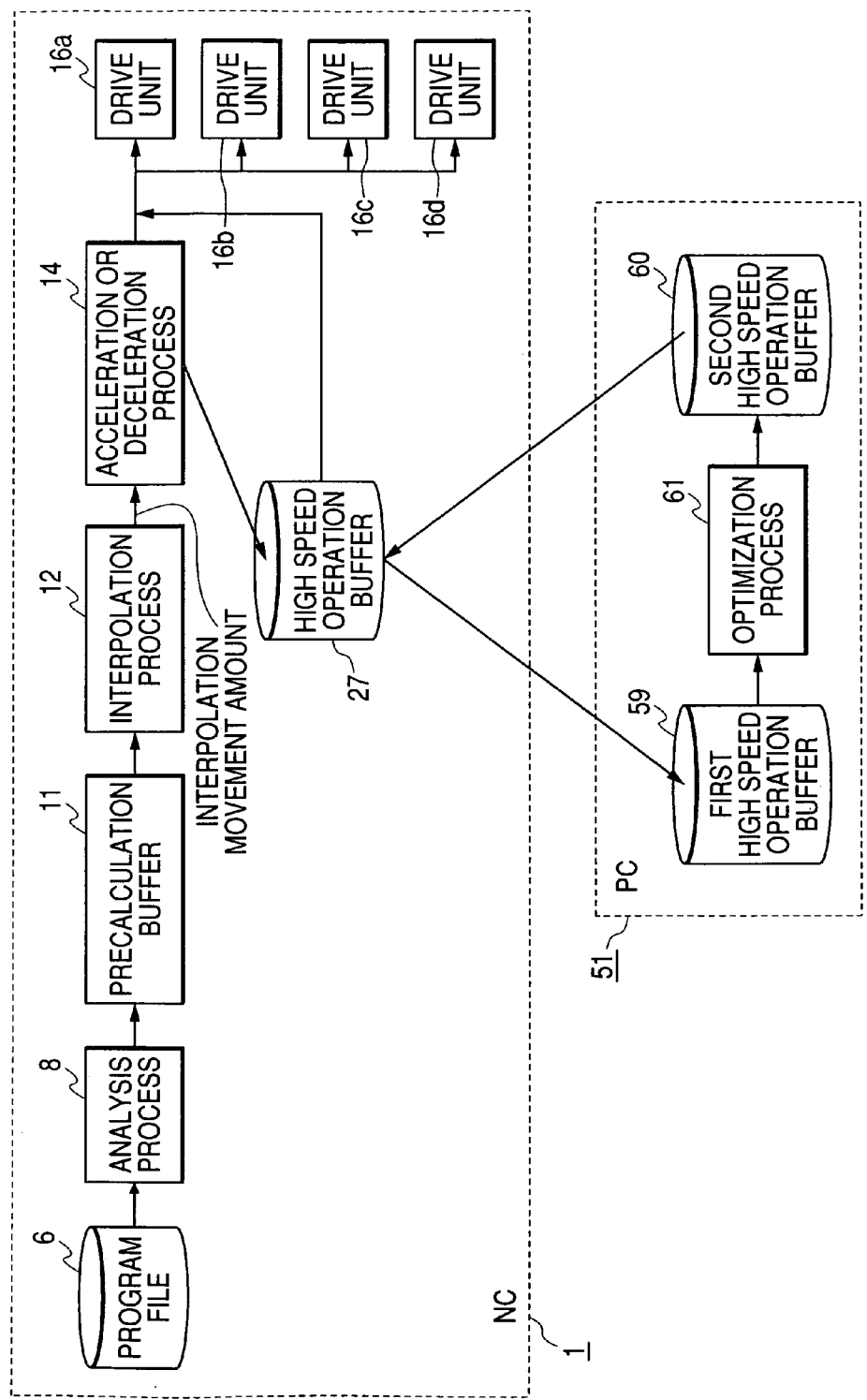
FIG. 3 is a data flowchart in which the interpolation movement amount is stored in the high speed operation buffer after the acceleration or deceleration process in the numerical control system according to the embodiments 1 to 3 of the invention.

FIG. 1 is a block diagram showing the configuration of an NC system according to the embodiments 1 to 3 of the invention. FIGS. 2 and 3 are block diagrams showing the data flow of the essence of FIG. 1.

In FIGS. 1 to 3, reference numeral 1 denotes an NC apparatus, 2 denotes a CPU, 3 denotes an input unit I/F, 4 denotes a part program, and 5 denotes a data memory having a part program memory 6, a precalculation buffer 11, a parameter memory 9, an axial data memory 10 and a high speed operation buffer 27. Reference numeral 7 denotes a control program memory storing an analysis processing part 8, an interpolation processing part 12, an acceleration or deceleration processing part 14, an NC axis controlling part 13, a spindle controlling part 19, a PLC (Programmable Logic Controller) processing part 24, a screen processing part 25, and a basic controlling part 26, each of which is configured by a software program. Reference numerals 15a to 15d denote axis control I/Fs, 16a to 16d denote control axis drive units, 17a to 17d denote control axis motors, 18a to 18d denote detectors for control axis motor, 19 denotes a spindle controlling part, 20 denotes a spindle I/F, 21 denotes a spindle drive unit, 22 denotes a spindle motor, and 23 denotes a detector for spindle motor.

Reference numeral 30 denotes a CRT, 32 denotes a keyboard, 32 denotes a CRT I/F, 33 denotes a K/B I/F, 34 denotes a program input unit, 35 denotes a machine or operator control panel, 36 denotes an input/output I/F, and 39 denotes a communication I/F.

Reference numeral 51 denotes a personal computer (hereinafter referred to as a PC), 52 denotes a CPU, and 53 denotes a data memory comprising a first high speed operation buffer 59, a second high speed operation buffer 60, and an edit memory 64. Reference numeral 54 denotes a control program memory storing an optimization processing part 61 and a time series data parallel display processing part 62, each of which is configured by a software block. Reference numeral 55 denotes a CRT, 56 denotes a keyboard, 57 denotes a CRT I/F, 58 denotes a K/B I/F, 65 denotes a communication I/F and 66 denotes a communication line.

The operation of FIG. 1 will be described below.

The CPU 2 of the NC apparatus 1 is a central processing unit connected to various kinds of units constituting the NC apparatus 1 via an address and data bus line. The CPU 2 makes various operations or processings in accordance with instructions composing the part program stored in the basic controlling part 26 within the control program memory 7, and controls each unit to implement the function of the NC apparatus by executing various kinds of part program within the control program memory 7.

The input unit I/F 3 reads the part program 4 for initiating and controlling the program input unit 34 and controlling the machine tool, and stores it as a file in the part program memory 6 within the data memory 5. The part program 4 is read again from the part program memory 6 at high speed and executed.

The part program read from the part program memory 6 is decrypted by the analysis processing part 8 within the control program memory 7, and calculates a reference point or object position necessary for the linear movement or circular movement, based on the data following the preparation word (G) code or coordinate word (address) such as X or Z, using coordinate data of the axial data memory 10 by referring to the parameters set in the parameter memory 9, the calculated reference point or object position being stored in the precalculation buffer 11.

The interpolation processing part 12 calculates the interpolation movement amount of each axis to be moved within a control unit time ($\Delta T$), for example, 10 milliseconds, of the NC apparatus from the position or speed data stored in the precalculation buffer 11, in which the interpolation movement amount is input into the NC axis controlling part 13. The NC axis controlling part 13 updates the coordinate values in accordance with the input interpolation movement amount. The acceleration or deceleration processing part 14 within the NC axis controlling part 13 makes the acceleration or deceleration process for gradually changing the interpolation movement amount (=feed speed) per control unit time $\Delta T$ in accordance with the acceleration or deceleration time constant or acceleration or deceleration pattern set in the parameter memory 9.

The interpolation movement amount subjected to acceleration or deceleration processing in the acceleration or deceleration processing part 14 is output via the control axis I/F 15a to 15d for each control axis to the control axis drive unit 16a to 16d, and converted into the motor drive power, which is applied to each control axis motor 17a to 17d. The rotation of each control axis motor 17a to 17d is detected by the detector 18a to 18d directly connected, and fed back to the control axis drive unit 16a to 16d to be used for the speed loop control, or fed back as the position information via the control axis I/F 15a to 15d to the axial data memory 10 to update the machine position.

Also, the spindle rotation number information prepared in the precalculation buffer 11 is converted into the rotating speed command value by the spindle controlling part 13, and input via the spindle I/F 20 into the spindle drive unit 21. The spindle drive unit 21 amplifies the electric power of the rotating speed command value, which is applied to the spindle motor 22 to rotationally drive the spindle. The rotation of the spindle motor 22 is detected by the detector 23 mechanically coupled with the motor 22, and input into the spindle drive unit 21 to constitute a speed feedback loop. Also, the detector output is input via the spindle drive unit 21 and the spindle I/F 20 into the axial data memory 10.

The part program, parameter data and tool locus regarding the control may be displayed on the CRT 30, and the part program or parameters may be input from the keyboard 31. The CRT 30 and the keyboard 31 are realized by accessing the data memory 5 connected via the CRT I/F 32 and the K/B I/F 33 on the bus line. The display data is produced in a predefined format by the screen processing part 25.

The PLC processing part 24 makes the sequence control as a programmable logic controller built in the NC apparatus, and controls the machine operation in accordance with the MST commands (Miscellaneous command, Spindle command, tool command) in the part program. Also, under the control of this PLC processing part 24, the status of each of various operation switches on the machine or operation control panel 35 is read via the input/output I/F 36, or the indicators or solenoids are driven.

The communication I/F 39 is the interface for data communication for transferring the data such as interpolation movement amount stored in the high speed operation buffer 27 of the NC apparatus 1 to the high speed operation buffers 59, 60 of the external apparatus, or vice versa. In this embodiment, data is transferred via the communication line 66 and the communication I/F 65 to the PC 51.

The CPU 52 is the central processing unit for the PC 51, and executes the instructions as described in a variety of application programs in accordance with a basic control program (not shown) within the control program memory 54 connected via the address bus or data bus. In this embodiment, the CPU 52 makes the input/output control for the CRT 55 or keyboard 56 via the CRT I/F 57 or the K/B I/F 58, as well as the control for data communication with the NC apparatus 1 via the communication I/F 65, so that the group of interpolation movement amounts (before or after acceleration or deceleration process) transferred from the high speed operation buffer 27 of the NC apparatus 1 to the first high speed operation buffer 59 of the PC 51 is treated through various processes (conversion process according to the purposes, which is performed for the group of interpolation movement amounts) described in the optimization processing part 61, using the edit memory 64, and stored in the second high speed operation buffer 60. Also, the group of interpolation movement amounts (before or after acceleration or deceleration process) stored in the first high speed operation buffer 59 is displayed in time series on the screen of the CRT 55 by the time series data parallel display processing part 62, and the program blocks of the part program corresponding to the group of interpolation movement amounts being displayed are displayed in parallel on the same screen for easy reference. If the result of interpolation movement amounts optimized according to a desired object by the optimization processing part 61 upon an operation on the keyboard 56 by the operator is stored in the second high speed operation buffer 60, and sent via the communication I/F 65, the communication line 66, the communication I/F 39 from the second high speed operation buffer 60 to the high speed operation buffer 27 of the NC apparatus 1 upon a transfer operation newly instructed.

FIG. 2 is a diagram showing the data flow using the essence of FIG. 1, in which the interpolation movement amount before the acceleration or deceleration process is stored in the high speed operation buffer 27.

The part program stored as the part program file 6 is analyzed by the analysis processing part 8 in terms of the coordinate values following the address such as X, Z described in the part program, based on the G code, and handled through a predetermined process corresponding to each code commanded with M, S and T. Each coordinate data or command data obtained as a result is stored in the precalculation buffer 11. Each data stored in the precalculation buffer 11 is subjected to the interpolation process in the interpolation processing part 12, whereby the movement amount for each axis for ΔT is obtained as the interpolation movement amount.

The interpolation movement amount is input into the acceleration or deceleration processing part 14, and converted into the movement amount for each control axis in accordance with the acceleration or deceleration pattern and the time constant, the movement amount for each axis being output to the drive unit 16a to 16d for each control axis. At the same time with this process, the interpolation movement amount or other control data is sequentially stored in the high speed operation buffer 27 of the NC apparatus 1. The data is sequentially read from the high speed operation buffer 27, and input into the acceleration or deceleration processing part 14 for making the acceleration or deceleration process during the high speed operation after program check, in which the movement amount after the acceleration or deceleration process is output to the drive unit 16a to 16d for each axis. As a result, the servo motor built into the machine tool, not shown, is rotated in a specified manner to perform the desired processing.

The data stored in the high speed operation buffer 27 of the NC apparatus is transferred to the first high speed operation buffer 59 on the PC side upon an operation from the NC apparatus 1 or PC 51, subjected to the optimization process to deal with the functions prepared in the optimization processing part 61, and stored in the second high speed operation buffer 60. The data stored in the second high speed operation buffer 60 is transferred to the high speed operation buffer 27 on the NC side by operating the NC apparatus 1 or PC 51.

FIG. 3 is a diagram, like FIG. 2, showing the data flow using the essence of FIG. 1, in which the interpolation movement amount after the acceleration or deceleration process is stored in the high speed operation buffer 27.

The part program stored as the part program file 6 is analyzed by the analysis processing part 8 in terms of the coordinate values following the address such as X, Z described in the part program, based on the G code, and handled through a predetermined process corresponding to each code commanded with M, S and T. Each coordinate data or command data obtained as a result is stored in the precalculation buffer 11. Each data stored in the precalculation buffer 11 is subjected to the interpolation process in the interpolation processing part 12, whereby the movement amount for each axis for ΔT is obtained as the interpolation movement amount.

The interpolation movement amount is input into the acceleration or deceleration processing part 14, and converted into the movement amount for each control axis in accordance with the acceleration or deceleration pattern and the time constant, the movement amount for each axis being output to the drive unit 16a to 16d for each control axis. In this figure, at the same time when each axis data subjected to the acceleration or deceleration process is output to the drive unit 16a to 16d for each control axis the each axis data subjected to the acceleration or deceleration process is sequentially stored in the high speed operation buffer 27 of the NC apparatus 1. Also, the stored data is sequentially read from the high speed operation buffer 27, and output to the drive unit 16*a* to 16*d* for each axis during the high speed operation after program check. As a result, the servo motor built into the machine tool, not shown, is rotated or moved in a specified manner to perform the desired processing.

The data stored in the high speed operation buffer 27 of the NC apparatus is transferred to the first high speed operation buffer 59 on the PC side upon an operation from the NC apparatus 1 or PC 51, subjected to the optimization process to deal with the functions prepared in the optimization processing part 61, and stored in the second high speed operation buffer 60. The data stored in the second high speed operation buffer 60 is transferred to the high speed operation buffer 27 on the NC side by operating the NC apparatus 1 or PC 51.

FIG. 4 is a table showing one configuration example of data stored in the high speed operation buffers 27, 59 and 60. Herein, axis 1 and axis 2 as the interpolation movement amount (data before or after the acceleration or deceleration process) for each axis in each system, M, S, T as the MST execution information (Misclellaneous command, spindle command, tool command), wait FG indicating that data is left as significant data even if the axial data or MST execution data does not exist, and SQ_No (including the block number) as the sequence number of the part program that is the source of the data are determined in the storage location. Various kinds of control data based on the operation result or processed result for every ΔT from the start of executing the part program are stored. Accordingly, one line of data in FIG. 4 is read and executed repeatedly, whereby the machine is operated at high speed without performing the time-consuming operation. In FIG. 4, DT_No is the data number appended to the group of interpolation data (FΔT) stored for every ΔT in the order of time. The data number DT_No and the sequence number SQ_No are related and stored, and thus retrieved from each other.

Figure 5A:
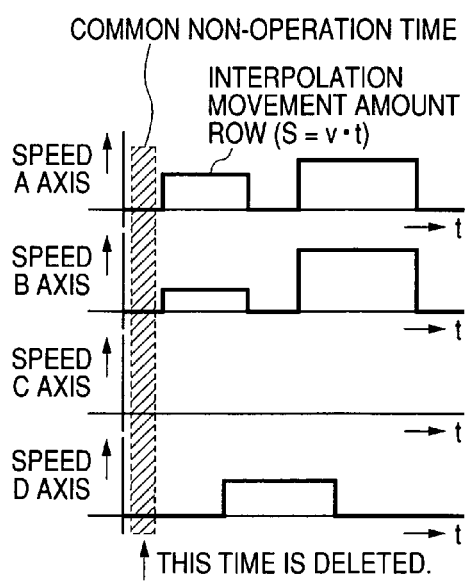
FIGS. 5A and 5B are time chart comparison views for deleting or editing the common no-operation time in the numerical control system according to the embodiment 1 of the invention.

FIG. 5A is a time chart showing the interpolation movement amount for each control axis stored in the system having the configuration of FIG. 2 that is displayed in time series on the screen of the CRT 55. In FIG. 5A, A axis and B axis correspond to the first axis and the second axis in the first system, and C axis and D axis correspond to the first axis and the second axis in the second system. Herein, the first axis and the second axis in the first system are under the interpolation control at the same time for two axes, and the second axis in the second system involves movement of one axis between two interpolation operations in the first system. In this screen display, a portion of the part program corresponding to the group of interpolation movement amounts being displayed is searched in the part program memory 6, based on the information DT_No and SQ_No as shown in FIG. 4, and displayed at arbitrary position on the same screen (not shown) by the time series data parallel display processing part 62 within the PC 51 in FIG. 1.

Due to the above reason, generally, a dead time (idle time) may occur periodically between the interpolation operations. In FIG. 5A, a hatching portion before the start of movement corresponds to the dead time, for example. This dead time is not found in the ordinary program check, because the operation is temporally stopped at a moment. Conventionally, the dead time can not be eliminated even though the presence of dead time is known, because it is the problem on the system.

Figure 5B:
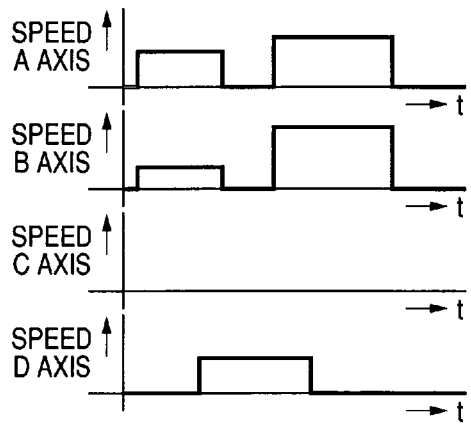

Referring to a flowchart of FIG. 6, a process for automatically editing the interpolation movement amount data as shown in FIG. 5B by eliminating the dead time common to both the systems in FIG. 5A will be described below. FIG. 5B shows an instance where the interpolation movement amount for each control axis after editing is redisplayed in time series on the screen of the CRT 55.

In FIG. 6, at step 101, the initial addresses of the first high speed operation buffer 59 and the second high speed operation buffer 60 are set as the transfer source address and the transfer destination address, respectively.

In order to check for the presence or absence of data in each line of the data table as configured in FIG. 4 in the first high speed operation buffer 59 for all the systems, at step 102, the loop number, namely, the number of control systems in the NC system+1 is set, because the check is performed at the top of the processing loop.

At step 103, to check whether or not the data presence or absence check (for one line in FIG. 4) is completed for all the systems, it is determined whether or not the previous value (number of systems+1) is equal to zero by decrementing it, every time the data presence or absence check for one system is ended (processing for one loop is ended).

If the determination result at step 103 is NO (≠0), the check for all the systems is not completed, whereby the procedure transfers to step 104 to make the data check for the next system. If the determination result at step 103 is YES (=0), the check for all the systems is completed, whereby the procedure branches to step 112. However, this branch occurs only when there is no data in all the systems, or if there is effective data anywhere, the procedure branches halfway on the loop to step 109.

At step 104, the presence or absence of movement information is checked. That is, if there is the movement amount for only one axis of two axes, this data can not be skipped. Herein, if there is no movement amount for both the axes, the procedure goes to step 105, or if there is movement amount, the procedure branches to step 109.

At step 105, the presence or absence of wait information is checked. This wait information indicates that the block is significant or meaningful even if there is no movement data regarding its system. For example, the wait information is set to "1" if a dwell (G04) instruction is being executed, or "0" if the dwell is completed (the specified time has passed). If it is determined that there is no wait information, the procedure goes to step 106. If there is the wait information, the procedure branches to step 109.

At steps 106 to 108, the presence or absence of MST execution is checked. This check for presence or absence is made by determining whether the data is "null" or non-null". If the command does not exist in the data, the data is "null", or if the command exists, the top address of the sub-program (in the typical NC, when the command such as M code is issued, the program for making its processing is stored as the sub-program) in which the processing corresponding to its code is described is written. If none of MST is executed, the procedure returns to step 103 to check for the next system, or if any of MST is executed, the procedure goes to step 109.

Step 109 is performed when any of the movement, wait and MST occurs. When any of movement, wait and MST occurs, it is unnecessary to further check for the line being checked at present (e.g., when the axis 1 in the first system has a movement command, it is unnecessary to perform steps 105 to 108). Therefore, the data (one line of data in FIG. 4) for all the systems at the data number being checked at present is transferred from the first high speed operation buffer 59 to the set address of the second high speed operation buffer 60.

Thereafter, the next addresses of both buffers are set at step 110, and the procedure goes to step 111.

At step 111, the information at the set address in the first high speed operation buffer 59 is read, for example, if the information is FFFF (Hex.) indicating the data end, the procedure is ended, because there is no subsequent data to be transferred. Also, if the information is not the data end, the procedure returns to step 102, the data check is performed for all the systems in the same manner.

Step 112 is performed when there is no data in all the systems, namely, the non-operation time common to all the systems exists. Herein, the first high speed operation buffer 59 alone has the address increased, and the second high speed operation buffer 60 is kept at the previous address.

Figure 7:
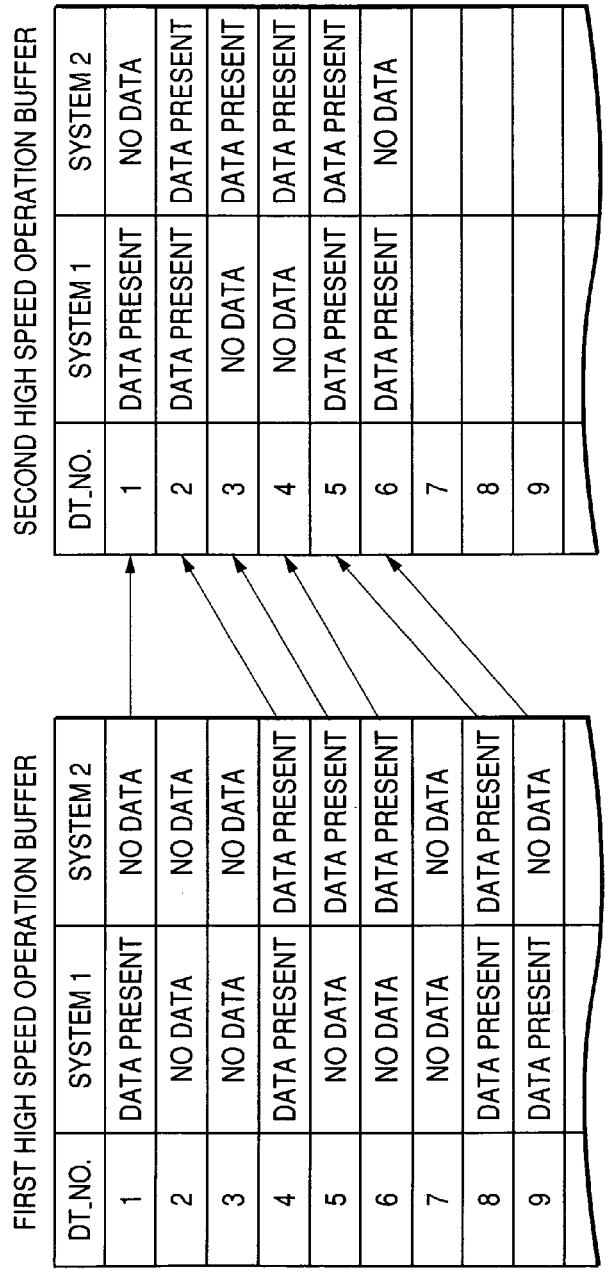
FIG. 7 is a table showing one edit example of data in the numerical control system according to the embodiment 1 of the invention.

Thereby, data is transferred to the second high speed operation buffer 60 by deleting a no-data portion in the first high speed operation buffer 59, as shown in FIG. 7. Consequently, the cycle time is shortened. For example, the lines having the data number 2, 3 and 7 have no data in FIG. 7, and are not transferred to the second high speed operation buffer 60, and the lines having the data number 1, 4, 5, 6, 8 and 9 are only transferred to the second high speed operation buffer 60.

Thereafter, the procedure goes to step 111 to check whether the data end takes place.

As described above, in the embodiment 1, the non-operation time necessarily occurring with the NC apparatus can be eliminated by the optimization processing part 61, whereby the cycle time is shortened and the productivity is improved.

Also, since the control data after the interpolation process is employed during the processing, the load of the CPU on the NC apparatus side is relieved.

Also, the control data stored in the first high speed operation buffer 59 is displayed on the screen of the CRT 55, and the non-operation time is eliminated for the control data upon a processing instruction issued based on the display contents, whereby it is possible to optimize the reduction of non-operation time as desired by the operator.

Also, when the control data stored in the first high speed operation buffer 59 is displayed on the screen of the CRT 55, in time series for each control axis, and in parallel, as shown in FIGS. 5A and 5B. Therefore, the relation between the control data for each control axis becomes very clear. Hence, it is possible to appropriately perform the optimization process for eliminating the non-operation time as desired by the operator.

Also, for the control data stored in the high speed operation buffer 27 on the side of the NC apparatus 1, the PC 51 connected to the NC apparatus 1 performs a processing for eliminating the non-operation time. Therefore, it suffices that the NC apparatus 1 is mainly provided with the high speed operation buffer 27, and it is unnecessary to greatly retrofit the existing NC apparatus 1. Since the CPU 2 on the side of the NC apparatus 1 is scarcely involved in the processing for eliminating the non-operation time, the NC apparatus 1 can perform another operation, while the PC 51performs the process for eliminating the non-operation time.

In the embodiment 1, an instance of eliminating the common non-operation time when the interpolation movement amount before the acceleration or deceleration processing is stored in the high speed operation buffer 27 (FIG. 2) has been described. However, when the interpolation movement amount after the acceleration or deceleration processing is stored in the high speed operation buffer 27 (FIG. 3), the common non-operation time can be also eliminated in the same manner as described previously.

Also, in the embodiment 1, the invention is applied to the dual system lathe, but may be applied to the single system or three or more systems NC lathe.

Embodiment 2 (Non-Interpolation Axis Shift)

Referring to FIG. 1, FIGS. 3 and 4, and FIGS. 8 to 10, an embodiment 2 of the invention will be described below.

Figure 8A:
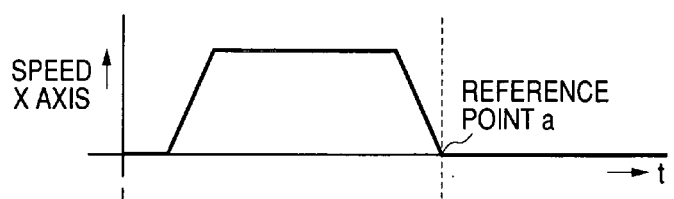
FIGS. 8A and 8B are time chart comparison views with time shift edit of non-interpolation axis data in a numerical control system according to an embodiment 2 of the invention.
Figure 8B:
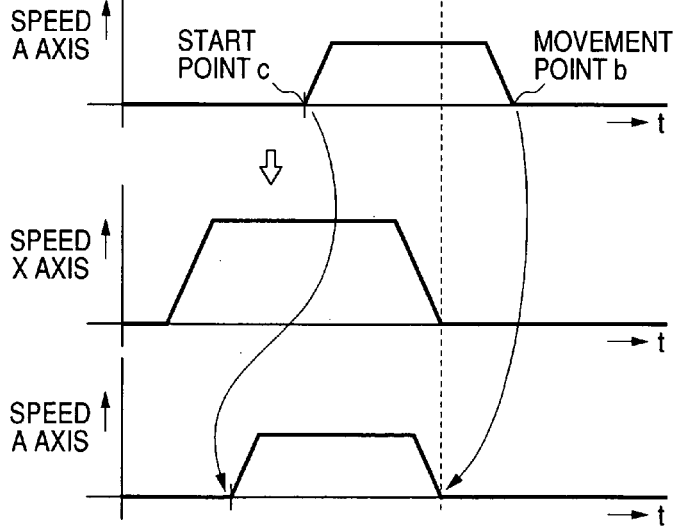
Figure 9:
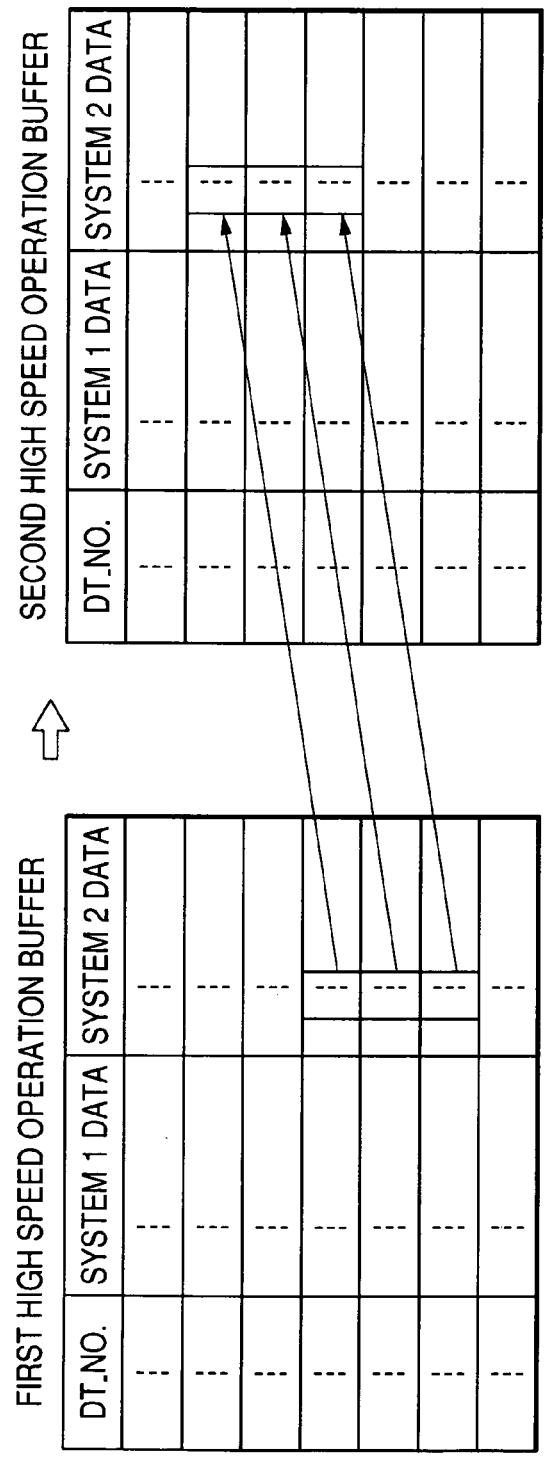
FIG. 9 is a table showing one edit example of data in the numerical control system according to the embodiment 2 of the invention.

FIGS. 8A and 8B are timing charts where the movement timing of non-interpolation axis (A axis) movement is adjusted with respect to the interpolation movement axis (X axis) of system 1. FIG. 8A shows the results of making an actual machine check for the part program, and FIG. 8B shows an example in which the end point of the non-interpolation axis of system 2 is matched with the "reference point "a"" of interpolation movement axis (X axis) of system 1 by making a shift process for changing the position of partial data in the optimization processing part 61 of the PC 51, for example, as shown in FIG. 9. The speed pattern as shown in FIG. 8A is displayed on the screen of the CRT 55, based on the data within the first high speed buffer 59. Also, the speed pattern as shown in FIG. 8B is displayed on the screen of the CRT 55, based on the operation data stored in the second high speed buffer 60 by the shift process.

Referring to a flowchart of FIG. 10, this shift process by the optimization processing part 61 and the time series data parallel display processing part 62 of the PC 51 will be described below.

In FIG. 10, at step 121, a multi-system part program is executed, and the movement amount per control unit time ($\Delta T$) after the acceleration or deceleration process is stored successively in the high speed operation buffer 27 as shown in FIG. 3.

After the end of operation, the stored data is transferred from the high speed operation buffer 27 on the side of the NC apparatus 1 to the first high speed operation buffer 59 on the side of the PC 51.

At step 122, the acceleration or deceleration data within the first high speed operation buffer 59 on the side of the PC to which the data is transferred is sequentially read and displayed as the speed pattern on the screen of the CRT 55 as shown in FIG. 8A. At the same time, a series of part programs corresponding to the displayed data numbers are searched within the part program memory 6 based on the information DT_No and SQ_No as shown in FIG. 4 and displayed on the same screen (not shown) by the time series data parallel display processing part 62.

At step 123, an inquiry to the operator as to whether or not to make the shift operation of the speed pattern being displayed is displayed on the screen of the CRT 55. If an instruction for making the shift operation is input by the keyboard 56 or a pointing device (not shown) associated with the PC 51, the procedure goes to step 124. If an instruction for making no shift operation is input, the procedure branches to step 127 to make preparations to display the next speed pattern.

At step 124, the operator instructs two positions (reference point a, movement point b) in the displayed speed pattern to be matched with the end point, and the start point c of the acceleration or deceleration pattern for the axis to be shifted on the screen, using the pointing device. Based on this instruction, a shift functional part of the optimization processing part 61 acquires a time difference ($n*\Delta T$) from a difference n in the data number between two points a and b as instructed above, and acquires the number of data m for the axis to be shifted from the start point c and the movement point b, in which the time difference ($n*\Delta T$), the data number difference n between two points a and b, and the number of data m for the axis to be shifted are displayed on the screen of the CRT 55.

At step 125, the system of object, reference axis name, shift axis name, data number, time difference (or data number difference n), and the number of shift data m are displayed on the screen of the CRT 55 as a shift information screen, on the basis of the data number difference n between two points and the time difference (n*ΔT). The operator examines the displayed data and changes or sets up the data, as needed. The shift information screen is displayed at a predetermined region on the screen where the speed pattern is displayed as shown in FIG. 8A.

Then, the data in a displayed range is copied from the first high speed operation buffer 59 to the edit memory 64, the corresponding data from the shift start data number is moved to the predetermined position, based on the set information, and the speed pattern is redrawn on the screen, based on the shifted data, as shown in FIG. 8B.

At step 126, the operator checks whether or not the redisplayed speed pattern is changed as desired. If it is determined that recorrection is required, the procedure returns to step 125. If the change is adequate, the procedure goes to step 127, where the contents of the edit memory 64 are stored in the second high speed operation buffer 60, and the display data address is shifted for the next data, as shown in FIG. 9.

At step 128, the next data is read, and it is checked whether or not the data is at the data end. If not the data end, the procedure returns to step 122 to display the next data. At step 128, if the data end is judged, all the shift process is ended. Thereby, the procedure goes to step 129 where the data stored in the second high speed operation buffer 60 is transferred to the high speed operation buffer 27 on the NC side, and the procedure is ended.

As described above, in the embodiment 2, the optimization processing part 61 moves the storage location of relevant control data among the control data for each control axis stored in the first high speed operation buffer 59 so that the movement end time for any control axis may be coincident with the movement end time of specified control axis, and stores the moved control data in the second high speed operation buffer 60. Therefore, there is the effect that the machine control is efficiently made, and the productivity is improved.

Also, since the control data after the interpolation process is employed during the processing, the load of the CPU on the NC apparatus side is relieved during the processing.

Also, the control data stored in the first high speed operation buffer 59 is displayed on the screen of the CRT 55, and is treated through the previously described process upon a processing instruction issued based on the display contents, whereby the optimization process is effected as desired by the operator.

Also, the control data stored in the first high speed operation buffer 59 is displayed, on the screen of the CRT 55, for each control axis in time series and in parallel, as shown in FIGS. 8A and 8B, whereby the relationship between control data for each control axis is so clear that the optimization process is adequately made as desired by the operator.

Also, the control data stored in the high speed operation buffer 27 on the side of the NC apparatus 1 is treated through the previously described process by the PC 51 connected to the NC apparatus 1. Therefore, it suffices that the NC apparatus 1 is mainly provided with the high speed operation buffer 27, and it is unnecessary to greatly retrofit the existing NC apparatus 1. Since the CPU 2 on the side of the NC apparatus 1 is scarcely involved in the processing, the NC apparatus 1 can perform another operation, while the PC 51 is performing the processing.

Embodiment 3

(Acceleration or Deceleration Pattern Change for Non-Interpolation Axis)

Referring to FIG. 1, FIGS. 3 and 4, and FIGS. 11 to 14, an embodiment 3 of the invention will be described below.

Figure 11A:
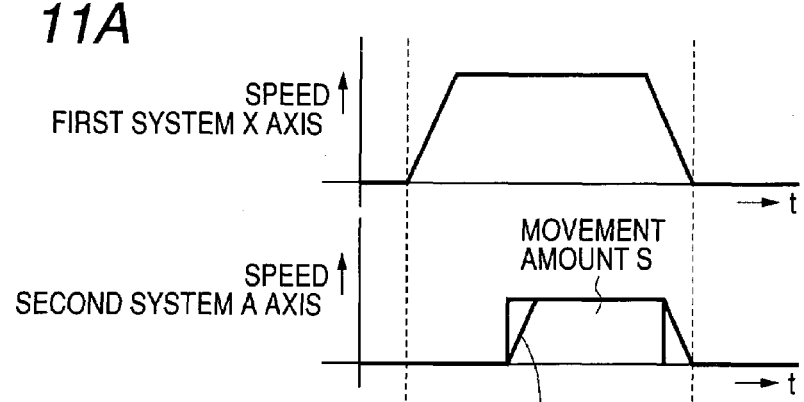
FIGS. 11A and 11B are time chart comparison views with non-interpolation axis parameter change edit in a numerical control system according to an embodiment 3 of the invention.
Figure 11B:
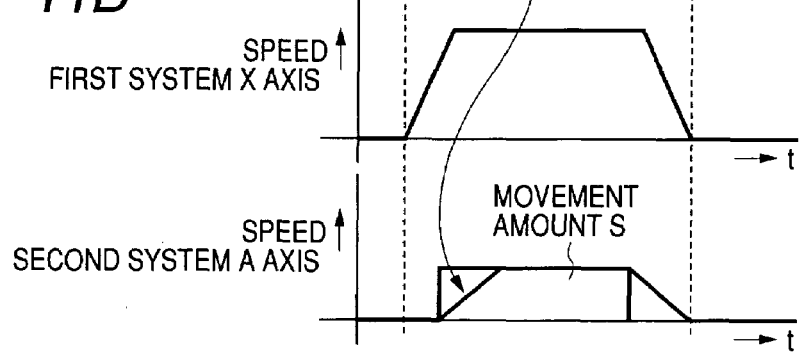

FIGS. 11A and 11B are timing charts for effectuating the interpolation axis of the first system and the non-interpolation axis of the second system at the same time, in which the operation form of the latter is changed in arbitrary manner. FIG. 11A shows the speed pattern of the operation upon a part program command before change. Since the execution of the non-interpolation axis (second system axis) may be completed during interpolation operation of the first system axis, as shown in FIG. 11B, the acceleration or deceleration time constant, the maximum speed and the acceleration or deceleration pattern can be changed by the optimization processing part 61 of the PC 51 under the condition where the movement amount of the second system axis is unchanged.

Figure 13:
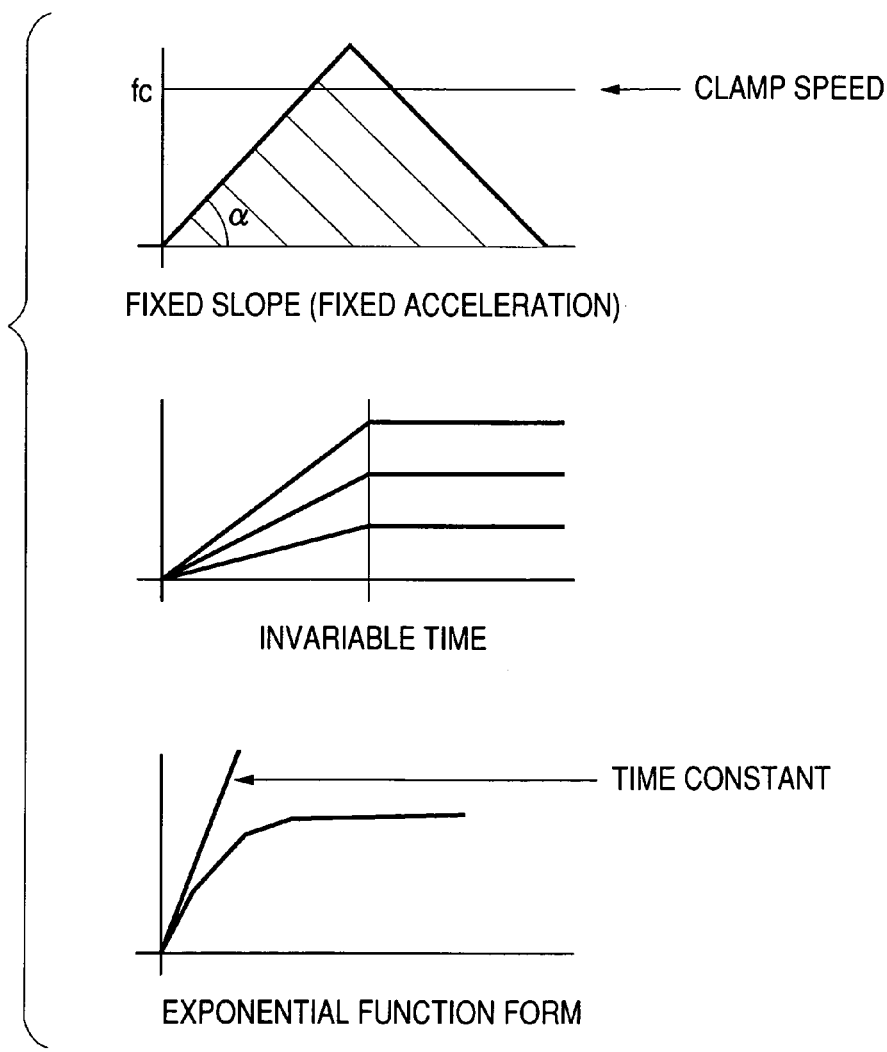
FIG. 13 is a view showing an acceleration or deceleration method selection menu in the numerical control system according to the embodiment 3 of the invention.
Figure 14:
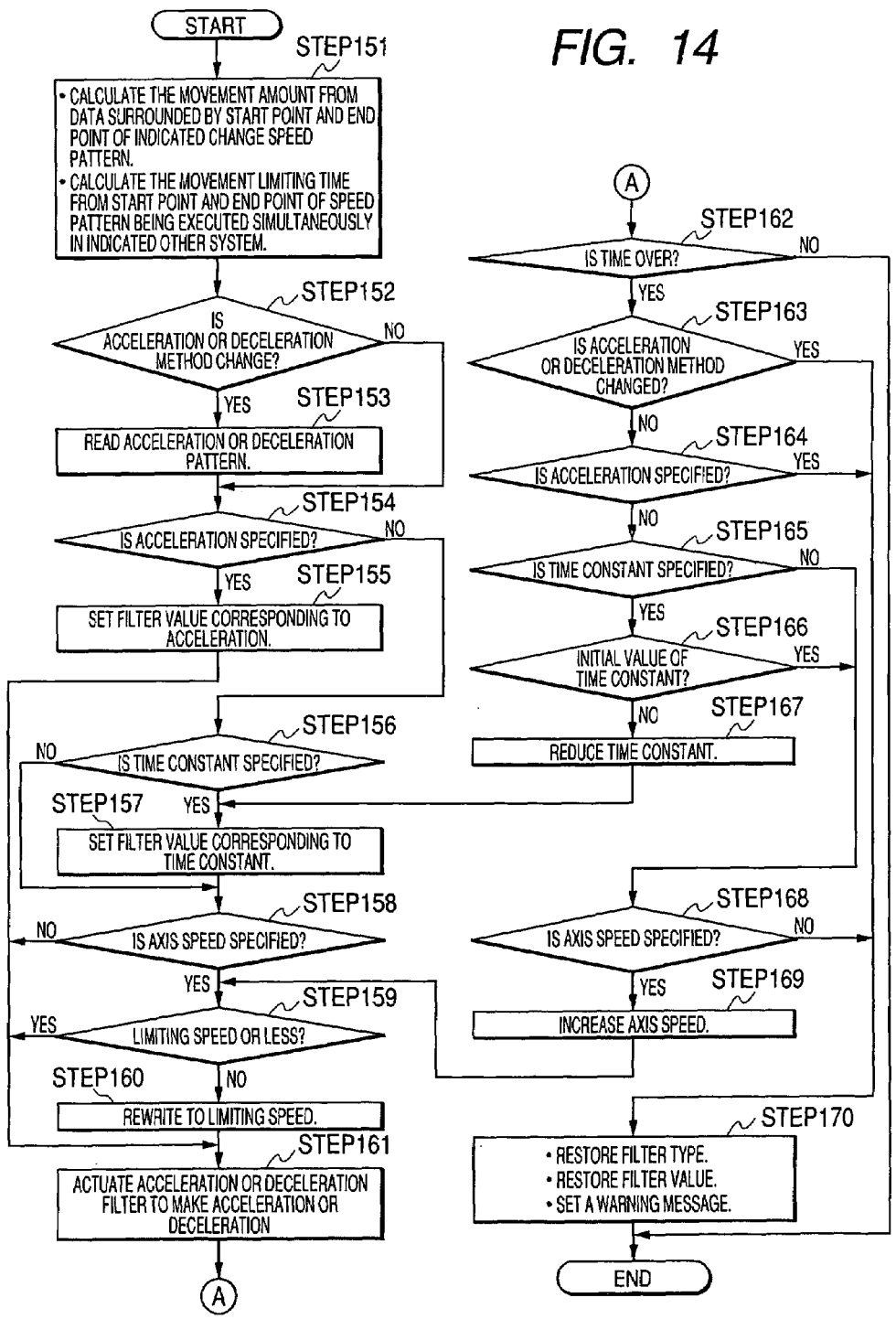
FIG. 14 is a flowchart showing non-interpolation axis acceleration or deceleration parameter change or recalculation in the numerical control system according to the embodiment 3 of the invention.

Referring to FIGS. 12 to 14, the change of various kinds of parameters will be described below.

The speed pattern as shown in FIG. 11A is displayed on the screen of the CRT 55 owing to a function of the time series data parallel display processing part 62, based on the data within the first high speed operation buffer 59. Also, the speed pattern as shown in FIG. 11B is displayed on the screen of the CRT 55 owing to the function of the time series data parallel display processing part 62, based on the operation data shifted and stored in the second high speed operation buffer 60.

FIG. 12 is a flowchart for inputting the change contents for the speed pattern of non-interpolation axis displayed on the screen mainly owing to the functions of the optimization processing part 61 and the time series data parallel display processing part 62 of the PC 51. A display related process is allotted to the time series data parallel display processing part 62, and other processes than the display related process are allotted to the optimization processing part 61 when recalculating the acceleration or deceleration data.

At step 131, the address corresponding to the data number of execution data stored in the first high speed operation buffer 59 is set up, and the procedure goes to step 132.

At step 132, the data stored in the first high speed operation buffer 59 is sequentially read, based on the specified address, and drawn as the speed pattern for each axis in each system on the screen as shown in FIG. 1A. Also, the part program corresponding to the displayed speed pattern is extracted from the part program memory 6, using the SQ_No (sequence number) data appended to each data, and displayed together with the speed pattern at a predetermined position on the screen by the time series data parallel display processing part 62.

At step 133, the operator judges whether or not the parameter change regarding the positioning of non-interpolation axis is required by referring to the speed pattern and the part program. If the change is not required, an indication that the change is not required is input from the keyboard 56. If this input is made, the procedure goes to step 134, where the address of display data is shifted. Then, the procedure returns to step 132 to display the next data group.

Also, if an indication that the parameter change is required is made, the procedure branches to step 135.

At step 135, the operator specifies the start point and end point of the speed pattern, and further the start point and end point of the speed pattern being executed at the same time in the other system, on the speed pattern display screen, using the pointing device (not shown) associated with the PC 51. Thereby, the movement data sampling range is specified, and the movement time after changing the acceleration or deceleration parameter is limited.

At step 136, the operator opens a parameter input screen to select an acceleration or deceleration method (fixed period of time, fixed slope, constant acceleration, etc.), as shown in FIG. 13, and further input the necessary data such as the acceleration, time constant, and feed speed, which are required for the acceleration or deceleration computation. Then, the procedure is ended.

At step 137, the acceleration or deceleration data is recalculated based on the various kinds of information selected or input to modify the data in the displayed range that has been copied before hand to the edit memory 64. After modification, the speed pattern is redrawn on the screen, based on the contents of the edit memory 64, as shown in FIG. 11B.

At step 138, the operator checks the acceleration or deceleration pattern redisplayed on the screen. If it is judged that the modification is required, the procedure returns to step 136 to input the data again. If it is judged that the modification is not required, the procedure goes to step 139.

At step 139, the modified contents of the edit memory 64 are stored in the second high speed operation buffer 60, and the data address corresponding to the next data number is created to display the next range. Then, the procedure goes to step 140.

At step 140, the information at the specified address is read, and if the information indicating the data end is not read, the procedure returns to step 132 to display the next display range and modify and check the data in the same manner. If the information indicating the data end is read, the procedure goes to step 141, where the contents of the second high speed operation buffer 60 are transferred to the high speed operation buffer 27 on the NC side. Then, the procedure is ended.

FIG. 14 is a flowchart showing the processing contents for recalculating the acceleration or deceleration data stored in the first high speed operation buffer 59, based on the newly input parameters for positioning as in FIG. 12.

At step 151, first of all, the movement amount is calculated by adding up the data surrounded by the start point and end point of the speed pattern to be changed as specified by the operator. Subsequently, the limited movement time is obtained from the start point and end point of the speed pattern being executed in the other system, as specified similarly.

At step 152, it is checked whether or not the acceleration or deceleration method is changed. If the acceleration or deceleration method is changed, the procedure goes to step 153, where an acceleration or deceleration filter for generating an acceleration or deceleration pattern function is selected. Then, the procedure goes to step 154. At this time, if the acceleration or deceleration method is not appropriate, it is required to restore the operation, whereby the original acceleration or deceleration method is stored in a temporary memory of the edit memory 64 to provide for the restoration. If the acceleration or deceleration method is not changed, the procedure branches to step 154 to check whether or not the acceleration is specified as the change information. If the acceleration is specified, the procedure goes to step 155. If the acceleration is not specified, the procedure branches to step 156.

At step 155, the filter value of the acceleration or deceleration filter corresponding to the acceleration is set. Then, the procedure branches to step 161. However, if the acceleration value is not appropriate, it is required to restore the operation, whereby the original value as save data is stored in the temporary memory of the edit memory 64. The acceleration or deceleration filter to be operated is employed on the actual machine, but actuated as one function of the optimization processing part, separately from the normal NC control operation.

At step 156, it is checked whether or not the time constant is input. If the time constant is not specified, the procedure branches to step 158. If the time constant is specified, the procedure goes to step 157 to set the filter value according to the time constant. In this case, if the time constant is not appropriate, it is required to restore the operation, whereby the original value as save data is stored in the temporary memory of the edit memory 64. The acceleration or deceleration filter to be operated is employed on the actual machine, but actuated as one function of the optimization processing part 61, separately from the normal NC control operation.

At step 158, it is checked whether or not axis speed is input. If the axis speed is not specified, the procedure branches to step 161. If the axis speed is specified, the procedure goes to step 159, where it is checked whether or not the axis speed is less than equal to the limiting speed corresponding to the machine.

At step 159, it is judged that the specified axis speed is less than equal to the limiting speed, the procedure branches to step 161. Also, at step 159, if it is judged that the specified axis speed exceeds the limiting speed, the procedure goes to step 160, where the axis speed is rewritten with the limiting speed. Then, the procedure goes to step 161.

At step 161, the acceleration or deceleration filter is actuated to make the acceleration or deceleration, based on the input acceleration or deceleration pattern, acceleration, time constant, and axis speed. As a result of this acceleration or deceleration process, the positioning time after change is apparent. Therefore, at step 162, it is checked whether or not the positioning is completed within a period of interpolation movement time for the axis in the other system. If it is judged that the time is not over, there is no problem in the acceleration or deceleration process, and the procedure is ended.

At step 162, if it is judged that the time is over, the procedure goes to step 163 to check whether or not the changed content at the present time is the acceleration or deceleration pattern. If the changed content is the acceleration or deceleration pattern, the procedure branches to step 170. If the changed content is not the acceleration or deceleration pattern, the procedure goes to step 164.

At step 164, it is checked whether or not the changed content at the present time is the acceleration. If the changed content is the acceleration, the procedure branches to step 170. If the changed content is not the acceleration, the procedure goes to step 165.

At step 165, it is checked whether or not the changed content at the present time is the time constant. If the changed content is not the time constant, the procedure branches to step 168. If the changed content is the time constant, the procedure goes to step 166.

At step 166, it is checked whether or not the changed time constant is the value before changed (initial value) (the time constant is made smaller). If the time constant is restored to the initial value, the procedure transfers to step 168. If No is determined at step 166, the procedure goes to step 167, because it is permitted to make the time constant smaller. At step 167, the time constant is made smaller by a predetermined amount, and the procedure returns to step 157 to make the acceleration or deceleration process again.

At step 168, it is checked whether or not the changed content is the axis speed. If it is judged that the changed content is the axis speed, the procedure goes to step 169 to increase the axis speed by a predetermined amount. Then, the procedure returns to step 159 to make the acceleration or deceleration process again. At step 168, if it is judged that the changed content is not the axis speed, the procedure transfers to step 170, where the type of acceleration or deceleration filter and the filter value of acceleration or deceleration filter are restored, and a warning message indicating that the change is inappropriate is set. Then, the procedure is ended.

As described above, in the embodiment 3, the optimization processing part 61 changes the contents of relevant control data so that the positioning of arbitrary control axis is made within a period of movement time for the specified control axis, and stores the processing result in the second high speed operation buffer 60. Therefore, the movement control for any control axis has the control data modified so that the machine load is relieved in a certain process, whereby the machine life is lengthened.

Since the control data after the interpolation process is employed during the processing, the CPU load on the NC apparatus side is relieved during the processing.

Also, the control data stored in the first high speed operation buffer 59 is displayed on the screen of the CRT 55, and is treated through the previously described process upon a processing instruction issued based on the display contents, whereby the optimization process is effected as desired by the operator.

Also, the control data stored in the first high speed operation buffer 59 is displayed, on the screen of the CRT 55, for each control axis in time series and in parallel, as shown in FIGS. 8A and 8B, whereby the relationship between control data for each control axis is so clear that the optimization process is adequately made as desired by the operator.

Also, the control data stored in the high speed operation buffer 27 on the side of the NC apparatus 1 is treated through the previously described process by the PC 51 connected to the NC apparatus 1. Therefore, it suffices that the NC apparatus 1 is mainly provided with the high speed operation buffer 27, and it is unnecessary to greatly retrofit the existing NC apparatus 1. Since the CPU 2 on the side of the NC apparatus 1 is scarcely involved in the processing, the NC apparatus 1 can perform another operation, while the PC 51 is performing the processing.

In the embodiments 1 to 3, the optimized control data is stored again in the high speed operation buffer 27 of the NC apparatus 1 that stores the control data for control axis obtained by making an actual machine check for the part program of the numerical control machine tool. However, the NC apparatus 1 may be provided with another high speed operation buffer, separately from the high speed operation buffer 27, whereby the optimized control data is stored in another high speed operation buffer.

Also, in the embodiments 1 to 3, the optimized control data is stored again in the high speed operation buffer 27 of the NC apparatus 1 that stores the control data for control axis obtained by the check for the part program of numerical control machine tool on the actual machine. However, if the data transfer rate between the NC apparatus 1 and the PC 51 is sufficiently fast, the optimized control data may not be stored again in the high speed operation buffer 27 of the NC apparatus 1, but the control data stored in the second high speed operation buffer 60 may be employed for the processing.

Embodiment 4

Figure 15:
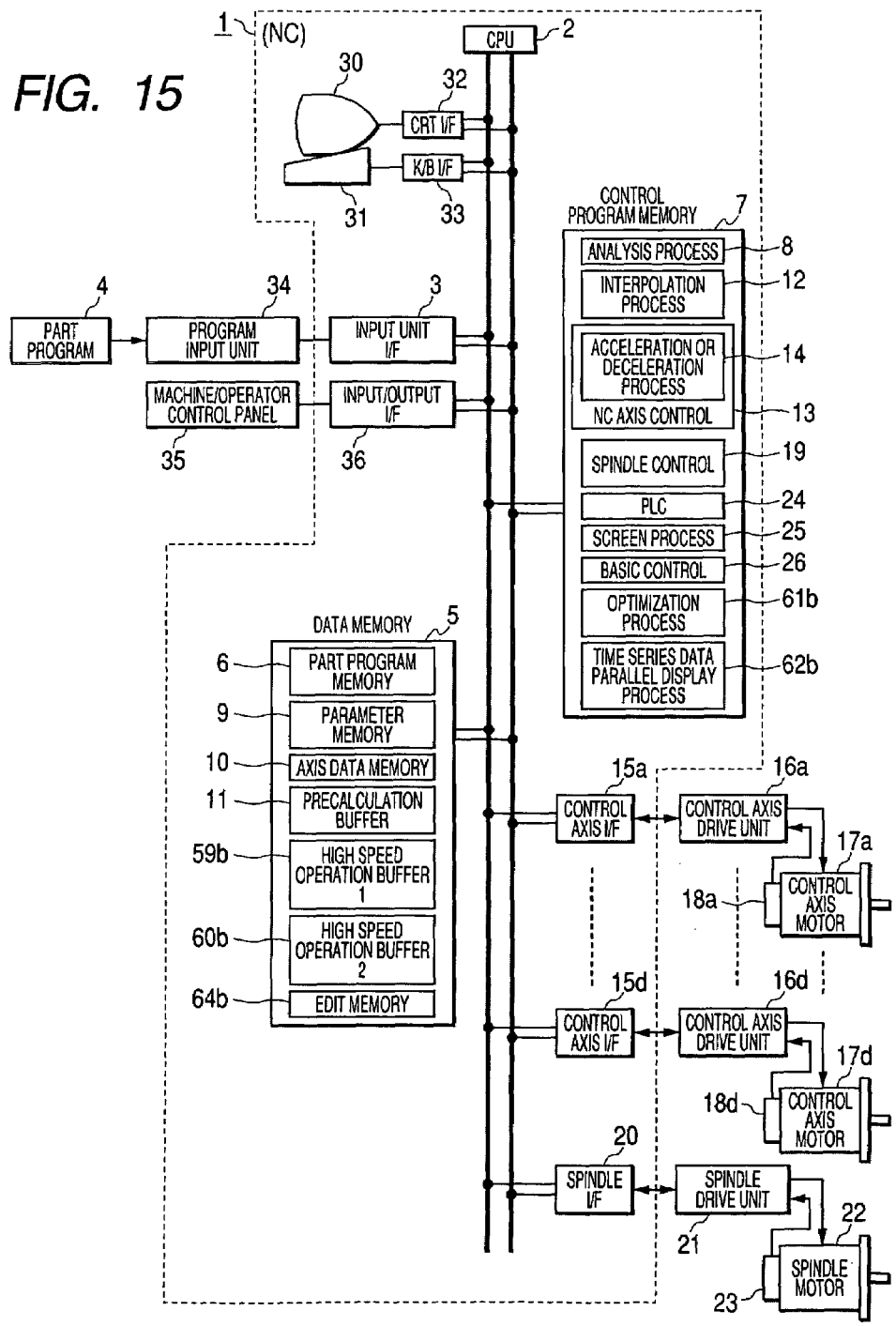
FIG. 15 is a block diagram of a numerical control system (without using the PC) according to an embodiment 4 of the invention.
Figure 16:
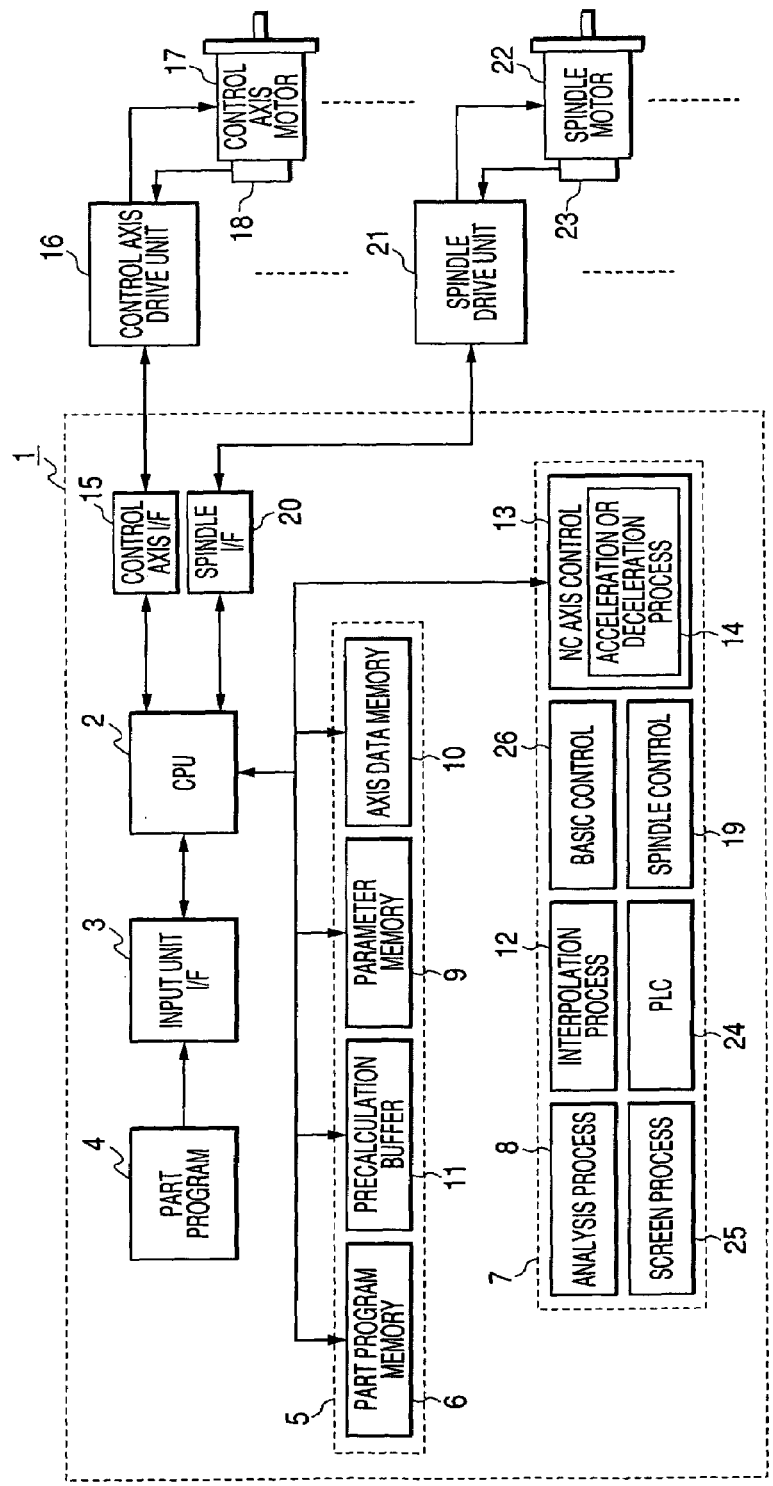
FIG. 16 is a block diagram of the conventional numerical control system.

FIG. 15 is a variation of FIG. 1 in the embodiment 1. A specific point is that the NC apparatus 1 and the personal computer 51 are connected to perform the optimization process using the memory of the PC 51 in FIG. 1, but the personal computer 51 is omitted and the NC apparatus 1 alone is employed to implement the optimization process with the memory transferred from the personal computer 51 to the NC apparatus 1 and the optimization processing part.

Accordingly, the equivalent software and memory (optimization processing part 61b, time series data parallel display processing part 62b, high speed operation buffers 59b, 60b, edit memory 64b) to various kinds of software and memory (optimization processing part 61, time series data parallel display processing part 62, high speed operation buffers 59, 60, edit memory 64) owned on the side of the personal computer 51 are incorporated into the NC apparatus 1.

As this change is made, the data transfer between the NC apparatus 1 and the PC 51 is unnecessary, whereby the first high speed operation buffer 59b and the second high speed operation buffer 60b also serve as the high speed operation buffer 27 owned by the NC apparatus 1 in the embodiment 1.

That is, at the time of staring to perform various processes (process for eliminating the non-operation time, process for matching the movement end time of any control axis with the movement end time of specified control axis, process for making the positioning of any control axis within a period of movement time for specified control axis) as described in the embodiments 1 to 3, the interpolation movement amount (or the interpolation movement amount after the acceleration or deceleration process) is directly input into the first high speed operation buffer 59b, instead of the high speed operation buffer 27. Also, after performing those processes, the NC control is effected using the data in the second high speed operation buffer 60b, instead of the high speed operation buffer 27. The NC control may be made by transferring the optimized control data stored in the second high speed operation buffer 60b to the first high speed operation buffer 59b to update the data in the first high speed operation buffer 59b, and thereby using the updated data in the first high speed operation buffer 59b.

Function an operations of the other constituting elements are the same as in FIG. 1 and the same reference numeral denotes the same element.

As described above, with this invention, the numerical control method includes a step of storing in a memory the control data of a control axis obtained by making an actual machine check for a part program of a numerical control machine tool, a step of performing an optimization process of deleting a series of control data when the contents of all the control items at the same time are zero for the control data stored in the memory, and a step of executing the numerical control based on the optimized control data in the memory. Therefore, it is possible to delete the no-operation time inevitably occurring with the NC apparatus, further shorten the cycle time, and increase the productivity.

Also, this invention includes a step of storing in a memory the control data of a control axis generated at every control unit time in a numerical control apparatus, the control data being obtained as the output data by performing a part program for numerical control machine tool on an actual numerical control machine tool, a step of graphically displaying the control data stored in the memory as a speed pattern on a screen, and performing a predetermined optimization process for the control data upon a processing instruction issued based on the display contents, a step of storing the optimized control data in the memory, and a step of executing the numerical control based on the optimized control data in the memory, whereby it is possible to perform the optimization process (e.g., fine adjustment of movement timing) as desired by the operator. Also, when performing the optimization process for moving the storage position of the relevant control data so that the movement end time of any control axis may be coincident with the movement end time of a specified control axis, the efficient machine control can be effected. Also, when performing the optimization process for changing the contents of the relevant control data so that the positioning of any control axis may be finished within a period of movement time of the specified control axis, it is possible to modify the control data for controlling the movement of the control axis in a certain process to reduce the load on the machine, and extend the machine life.

Also, according to the invention, the control data stored in the memory is displayed on the screen in parallel for each control axis. Thereby, the relationship between the control data for each control axis is so clear that the optimization process is appropriately made as desired by the operator.

Also, according to the invention, the storage position of the relevant control data is moved so that the movement end time of any control axis may be coincident with the movement end time of a specified control axis, whereby the relation between the control data for each control axis is very clear, and the optimization process is appropriately made as desired by the operator.

Also, according to the invention, input for making the movement end time of a predetermined control axis coincident with the movement end time of another control axis is performed by indicating a predetermined location of the displayed speed pattern on the screen by using a pointing device, and storage position of the control data at the predetermined control axis are moved, based on the inputs, so that the movement end time of the predetermined control axis may be coincident with the movement end time of another control axis, whereby the fine adjustment for the movement timing can be made, and efficient machine control can be effected to increase the productivity.

Also, in this invention, an instruction for finishing the positioning of a predetermined control axis within a period of movement time of another control axis is made by indicating a predetermined location of the displayed speed pattern on the screen, using a pointing device, and the contents of the control data at the predetermined control axis are changed, based on the instruction, so that the positioning of the predetermined control axis may be finished within the period of movement time of another control axis, whereby it is possible to finely modify the control data for controlling the movement of the control axis in a certain process with a simple operation to reduce the load on the machine, and extend the machine life.

Also, according to this invention, a numerical control system comprises a memory for storing the control data of a control axis obtained by making an actual machine check for a part program of a numerical control machine tool, an optimization processing part for an optimization process of deleting a series of control data when the contents of all the control items at the same time are zero for the control data stored in the memory, a memory for storing the control data optimized by the optimization processing part, and a numerical controlling part for executing the numerical control based on the optimized control data in the memory, whereby it is possible to delete the non-operation time inevitably occurring with the NC apparatus, further shorten the cycle time, and increase the productivity.

Also, this invention comprises a memory for storing the control data of a control axis generated at every control unit time in a numerical control apparatus, the control data being obtained as the output data by performing a part program for numerical control machine tool on an actual numerical control machine tool, a display processing part for graphically displaying the control data stored in the memory as a speed pattern on a screen, an optimization processing part for performing a predetermined optimization process for the control data upon a processing instruction issued based on the display contents displayed on the display processing part, a memory for storing the optimized control data by the optimization processing part, and a numerical control part for executing the numerical control based on the optimized control data in the memory, whereby it is possible to perform the optimization process (e.g., fine adjustment for movement timing) as desired by the operator. Also, when performing the optimization process for moving the storage position of the relevant control data so that the movement end time of any control axis may be coincident with the movement end time of the specified control axis, the efficient machine control can be effected. Also, when the contents of the relevant control data are changed so that the positioning of any control axis may be finished within the period of movement time of the specified control axis, it is possible to modify the control data for controlling the movement of the control axis in a certain process to reduce the load on the machine, and extend the machine life.

Also, in this invention, when the display processing part displays the control data in parallel for each control axis when the control data stored in the memory is displayed on the screen, whereby the relation between the control data for each control axis is very clear, the optimization process is appropriately made as desired by the operator.

Also, in this invention, the optimization processing part moves the storage position of the relevant control data among the control data of each control axis stored in the memory so that the movement end time of any control axis may be coincident with the movement end time of a specified control axis, whereby the fine adjustment for the movement timing can be made, and the efficient machine control can be effected to increase the productivity.

Also, in this invention, the optimization processing part performs inputs for making the movement end time of a predetermined control axis coincident with the movement end time of another control axis, by indicating a predetermined location of the displayed speed pattern on the screen, using a pointing device, and moves the storage position of the control data at the predetermined control axis, based on the inputs so that the movement end time of the predetermined control axis may be coincident with the movement end time of another control axis, whereby the fine adjustment for the movement timing can be made with a simple operation, and the efficient machine control can be made to increase the productivity.

Also, in this invention, the optimization processing part performs an instruction for finishing the positioning of a predetermined control axis within a period of movement time of another control axis by indicating a predetermined location of the displayed speed pattern on the screen, using a pointing device, and changing the contents of the control data at the predetermined control axis, based on the instruction, so that the positioning of the predetermined control axis may be finished within the period of movement time of another control axis, whereby it is possible to finely modify the control data for controlling the movement of the control axis in a certain process with a simple operation to reduce the load on the machine, and extend the machine life.

INDUSTRIAL APPLICABILITY

As described above, the numerical control method and the numerical control system according to this invention are suitably employed to provide high efficiency and productivity, or control the multi-system.

The invention claimed is:

1. A numerical control method comprising:
storing in a memory a control data of a control axis obtained by making an actual machine check for a part program of a numerical control machine tool;
performing a predetermined optimization process for deleting a series of control data when contents of all control items at a same time are zero for the control data stored in said memory;
storing the optimized control data in the memory; and
executing a numerical control based on the optimized control data in said memory.

2. The numerical control system according to claim 1, wherein the predetermined optimization process is automatically executed by a processor independent from control by an operator.

3. A numerical control method comprising:
storing in a memory a control data of a control axis generated at every control unit time in a numerical control apparatus, the control data being obtained as an output data by performing a part program for a numerical control machine tool on an actual numerical control machine tool;
displaying graphically the control data stored in said memory as a speed pattern on a screen, and performing a predetermined optimization process for said control data upon a processing instruction issued based on the display contents;
storing said optimized control data in said memory; and
executing the numerical control based on said optimized control data in said memory.

4. The numerical control method according to claim 3, wherein when the control data stored in said memory is displayed on the screen, the control data is displayed in parallel for each control axis.

5. The numerical control method according to claim 3, wherein said optimization process includes performing inputs for making a movement end time of a predetermined control axis coincident with a movement end time of another control axis by indicating a predetermined location of a displayed speed pattern on the screen using a pointing device, and moving a storage position of the control data at a predetermined control axis based on said inputs so that the movement end time of the predetermined control axis may be coincident with the movement end time of another control axis.

6. The numerical control method according to claim 3, wherein said optimization process includes performing an instruction for finishing a positioning of a predetermined control axis within a period of a movement time of another control axis by indicating a predetermined location of a displayed speed pattern on the screen using a pointing device, and changing contents of the control data at the predetermined control axis, based on said instruction, so that the positioning of said predetermined control axis may be finished within a period of a movement time of another control axis.

7. The numerical control method according to claim 3, wherein said optimization processing part moves a storage position of a relevant control data so that a movement end time of any control axis may be coincident with a movement end time of a specified control axis.

8. A numerical control system comprising:
a memory for storing a control data of a control axis obtained by making an actual machine check for a part program of a numerical control machine tool;
an optimization processing part for performing automatically and independently from a control by an operator an optimization process of deleting a series of control data when contents of all control items at a same time are zero for the control data stored in said memory;
a memory for storing the control data optimized by said optimization processing part; and
a numerical controlling part for executing the numerical control based on the optimized control data in said memory.

9. A numerical control system comprising:
a memory for storing control data of a control axis generated at every control unit time in a numerical control apparatus, the control data being obtained as an output data by performing a part program for numerical control machine tool on an actual numerical control machine tool;
a display processing part for graphically displaying the control data stored in said memory as a speed pattern on a screen;
an optimization processing part for performing a predetermined optimization process for said control data upon a processing instruction issued based on a display contents displayed on said display processing part;
a memory for storing the optimized control data by said optimization processing part; and
a numerical control part for executing the numerical control based on the optimized control data in said memory.

10. The numerical control system according to claim 9, wherein said display processing part displays the control data in parallel for each control axis when the control data stored in said memory is displayed on the screen.

11. The numerical control system according to claim 9, wherein said optimization processing part inputs for making a movement end time of a predetermined control axis coincident with a movement end time of another control axis, by indicating a predetermined location of the displayed speed pattern on the screen using a pointing device, and moves a storage position of the control data at the predetermined control axis, based on said inputs so that the movement end time of said predetermined control axis may be coincident with a movement end time of another control axis.

12. The numerical control system according to claim 9, wherein said optimization processing part performs an instruction for finishing a positioning of a predetermined control axis within a period of a movement time of another control axis by indicating a predetermined location of the displayed speed pattern on the screen using a pointing device, and changing contents of the control data at the predetermined control axis, based on said instruction, so that the positioning of said predetermined control axis may be finished within the period of a movement time of another control axis.

13. The numerical control system according to claim 9, wherein said optimization processing part moves a storage position of a relevant control data among the control data of each control axis stored in said memory, so that a movement end time of any control axis may be coincident with a movement end time of a specified control axis.

14. A numerical control system comprising:
   a first memory storing a control data of a control axis obtained by making an actual machine check for a part program of a numerical control machine tool;
   a second memory storing the control data stored in the first memory;
   an optimization module automatically performing an optimization process of deleting dead time of a machining apparatus, wherein the dead time is deleted by detecting when contents of all control items at a same time are zero for the control data stored in the second memory and deleting a corresponding series of control data based on the detection;
   a third memory storing the control data optimized by said optimization module; and
   a numerical controlling module executing the numerical control based on the optimized control data in the third memory.

15. The numerical control system according to claim 14, wherein the numerical controlling module is configured to execute the numerical control based on the optimized control data in the third memory and based on the control data in the first memory when the optimization module does not optimize the control data.

16. The numerical control system according to claim 14, wherein the second and third memories and the optimization module are in a optimization computer separate from the first memory and the numerical controlling module.

17. The numerical control system according to claim 16, wherein:
   the first memory and the numerical controlling module are in a numerical control computer,
   the optimization module is executed by a processor in the optimization computer, and
   the control data is downloaded into the first memory of the numerical control computer.

18. The numerical control system according to claim 17, further comprising a communication module transmitting the control data from the first memory of the numerical control computer to the second memory of the optimization computer and transmitting the optimized control data from the third memory of the optimization computer to a processor of the numerical control computer executing the numerical controlling module.

19. The numerical control system according to claim 14, wherein the numerical controlling module is stored in a fourth memory, which stores control programs controlling the machining apparatus and wherein the first memory stores the control data for the control program.

* * * * *